(12) United States Patent
Strommen et al.

(10) Patent No.: US 12,537,469 B2
(45) Date of Patent: Jan. 27, 2026

(54) PORTABLE PEDESTAL FAN

(71) Applicant: MILWAUKEE ELECTRIC TOOL CORPORATION, Brookfield, WI (US)

(72) Inventors: Matthew D. Strommen, Greendale, WI (US); Srdjan Acimovic, Hales Corners, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 316 days.

(21) Appl. No.: 18/550,157

(22) PCT Filed: Mar. 11, 2022

(86) PCT No.: PCT/US2022/020001
§ 371 (c)(1),
(2) Date: Sep. 12, 2023

(87) PCT Pub. No.: WO2022/192704
PCT Pub. Date: Sep. 15, 2022

(65) Prior Publication Data
US 2024/0072707 A1    Feb. 29, 2024

Related U.S. Application Data

(60) Provisional application No. 63/160,298, filed on Mar. 12, 2021.

(51) Int. Cl.
*H02P 23/20* (2016.01)
*F04D 25/06* (2006.01)
(Continued)

(52) U.S. Cl.
CPC .......... *H02P 23/20* (2016.02); *F04D 25/0673* (2013.01); *F04D 27/004* (2013.01); *H02J 3/0073* (2020.01); *H02J 7/0063* (2013.01)

(58) Field of Classification Search
CPC ....... H02P 23/20; H02J 3/0073; H02J 7/0063; F04D 25/0673; F04D 27/004
See application file for complete search history.

(56) References Cited

U.S. PATENT DOCUMENTS

| 4,927,120 A | 5/1990 | Wang |
| 8,167,590 B1 | 5/2012 | Vidal et al. |

(Continued)

FOREIGN PATENT DOCUMENTS

| CN | 2750090 Y | 1/2006 |
| CN | 1854957 A | 11/2006 |

(Continued)

OTHER PUBLICATIONS

International Search Report and Written Opinion for Application No. PCT/US2022/020001 dated Jun. 20, 2022 (10 pages).

*Primary Examiner* — Cortez M Cook
(74) *Attorney, Agent, or Firm* — Michael Best & Friedrich LLP

(57) ABSTRACT

A portable fan having a power supply, a motor coupled to a plurality of fan blades and powered by the power supply, and a battery pack coupled to the portable fan and configured to provide power to the power supply. The portable fan further includes a controller configured to receive power from the power supply. The controller is configured to receive an input to control the motor at a requested speed, operate the motor at the requested speed, and initiate a ramp-down operation, wherein the ramp-down operation is configured to ramp down the speed of the motor from the requested speed over a period of time.

20 Claims, 20 Drawing Sheets

(51) Int. Cl.
  *F04D 27/00*   (2006.01)
  *H02J 3/00*    (2006.01)
  *H02J 7/00*    (2006.01)

(56) References Cited

U.S. PATENT DOCUMENTS

| | | | |
|---|---|---|---|
| 8,201,979 B2 | 6/2012 | Deighton et al. | |
| 8,651,438 B2 | 2/2014 | Deighton et al. | |
| 8,763,920 B1 | 7/2014 | Walsh | |
| 9,163,823 B2 | 10/2015 | Choksi et al. | |
| 9,303,853 B2 | 4/2016 | Deighton et al. | |
| 9,328,933 B2 | 5/2016 | Walsh et al. | |
| 9,500,386 B1 | 11/2016 | Walsh et al. | |
| 9,603,497 B2 | 3/2017 | Yamaoka et al. | |
| 9,671,125 B2 | 6/2017 | Mowris et al. | |
| 9,677,703 B2 | 6/2017 | He et al. | |
| 9,797,405 B1 | 10/2017 | Mowris et al. | |
| 9,974,241 B2 | 5/2018 | Yamaoka et al. | |
| 9,995,493 B2 | 6/2018 | Mowris et al. | |
| 10,000,900 B2 | 6/2018 | Yamaoka et al. | |
| 10,091,954 B1 | 10/2018 | Yamaoka et al. | |
| 10,264,739 B2 | 4/2019 | Yamaoka et al. | |
| 10,281,938 B2 | 5/2019 | Mowris et al. | |
| 10,337,526 B2 | 7/2019 | Shao et al. | |
| 10,337,528 B2 | 7/2019 | Rivera | |
| 10,487,850 B2 | 11/2019 | Shao et al. | |
| 10,533,768 B2 | 1/2020 | Mowris et al. | |
| 10,712,036 B2 | 7/2020 | Mowris et al. | |
| 10,774,487 B2 | 9/2020 | Yamaoka et al. | |
| 2001/0011695 A1 | 8/2001 | Hill et al. | |
| 2013/0265780 A1 | 10/2013 | Choksi et al. | |
| 2014/0346687 A1 | 11/2014 | Wozniak | |
| 2015/0120067 A1* | 4/2015 | Wing | H02J 7/00308 700/282 |
| 2015/0207359 A1 | 7/2015 | Ok et al. | |
| 2017/0208748 A1 | 7/2017 | Yamaoka et al. | |
| 2019/0126076 A1 | 5/2019 | Mclaughlin et al. | |
| 2019/0191638 A1 | 6/2019 | Yamaoka et al. | |
| 2020/0096006 A1 | 3/2020 | Shao et al. | |
| 2020/0200190 A1 | 6/2020 | Cen | |
| 2020/0284469 A1 | 9/2020 | Mowris | |
| 2020/0309152 A1 | 10/2020 | Sanford | |
| 2020/0318851 A1 | 10/2020 | Mowris | |
| 2020/0326088 A1 | 10/2020 | Mowris | |
| 2020/0363087 A1 | 11/2020 | Mowris et al. | |

FOREIGN PATENT DOCUMENTS

| | | |
|---|---|---|
| CN | 202612989 U | 12/2012 |
| CN | 203570617 U | 4/2014 |
| CN | 204984979 U | 1/2016 |
| CN | 106762729 A | 5/2017 |
| CN | 206655832 U | 11/2017 |
| CN | 108302057 A | 7/2018 |
| CN | 108691792 A | 10/2018 |
| CN | 108916093 A | 11/2018 |
| CN | 109210018 A | 1/2019 |
| CN | 208474159 U | 2/2019 |
| CN | 109779934 A | 5/2019 |
| CN | 110486306 A | 11/2019 |
| CN | 209704878 U | 11/2019 |
| CN | 108425874 B | 12/2019 |
| CN | 209800314 U | 12/2019 |
| CN | 210371299 U | 4/2020 |
| CN | 111322258 A | 6/2020 |
| CN | 111396348 A | 7/2020 |
| CN | 211175946 U | 8/2020 |
| CN | 211599065 U | 9/2020 |
| CN | 109779936 B | 12/2020 |
| KR | 20000022601 A | 4/2000 |
| KR | 20190114336 A | 10/2019 |
| WO | 2015118803 A1 | 8/2015 |

* cited by examiner

PORTABLE PEDESTAL FAN

CROSS-REFERENCE TO RELATED APPLICATIONS

This application is a national stage filing under 35 U.S.C. § 371 of International Application No. PCT/US2022/020001, filed on Mar. 11, 2022, which claims priority to, and the benefit of, U.S. Provisional Patent Application No. 63/160,298, filed Mar. 12, 2021, the contents of which are hereby incorporated by reference.

FIELD OF THE INVENTION

The present invention relates to cooling apparatuses and, more particularly, to transportable pedestal fans including foldable stands. Area pedestal fans are typically used to provide airflow to remote work areas or job sites that do not have sufficient airflow, moisture reduction, or the like. Some pedestal fans are compact or configurable into compact configurations, allowing the pedestal fans to be repositioned and easily transported to and from job sites.

SUMMARY

In one embodiment, a portable fan is described. The portable fan includes a power supply, a motor coupled to a number of fan blades, a battery pack coupled to the portable fan and configured to provide power to the power supply, and a controller configured to receive power from the power supply. The controller is further configured to receive an input to control the motor at a requested speed, operate the motor at the requested speed, and initiate a ramp-down operation, wherein the ramp-down operation is configured to ramp down the speed of the motor from the requested speed over a period of time.

In one aspect, the controller is further configured to determine whether a minimum ramp-down speed has been reached and operate the motor at the minimum ramp-down speed in response to determining that the minimum ramp-down speed has been reached.

In another aspect, the minimum ramp-down speed is 85% of the requested speed.

In one aspect, the controller is further configured to determine whether an AC power is coupled to the power supply and operate the motor at the requested speed in response to determining that the AC power is coupled to the power supply.

In another aspect, the ramp-down operation reduces the speed of the motor over time using a predetermined ramp-down rate.

In another aspect, the predetermined ramp-down rate reduces the output of the portable fan by 2 CFM per minute.

In another aspect, the battery pack is an 18V power tool battery pack.

In one embodiment, a method for controlling a portable fan powered by a removable battery pack is described. The method includes receiving an input to control a motor of the portable fan at a requested speed, operating the motor at the requested speed, and initiating ramp-down operation, wherein the ramp-down operation is configured to ramp down the speed of the motor from the requested speed over a period of time.

In one aspect, the method also includes determining whether a minimum ramp-down speed has been reached and operating the motor at the minimum ramp-down speed in response to determining that the minimum ramp-down speed has been reached.

In another aspect, the minimum ramp-down speed is 85% of the requested speed.

In one aspect, the method further includes determining whether an AC power is coupled to a power supply of the portable fan and operating the motor at the requested speed in response to determining that the AC power is coupled to the power supply.

In another aspect, the ramp-down operation reduces the speed of the motor over time using a predetermined ramp-down rate.

In another aspect, the predetermined ramp-down rate is configured to increase a run time of a battery pack coupled to the portable fan by 20%.

In another aspect, the predetermined ramp-down rate reduces the output of the portable fan by 2 CFM per minute.

In another embodiment, a portable fan is described, according to some embodiments. The portable fan includes a power supply, a motor coupled to a plurality of fan blades and powered by the power supply, a battery pack coupled to the portable fan and configured to provide power to the power supply, and a controller configured to receive power from the power supply. The controller is further configured to receive an input to control the motor at a requested speed, determine whether an AC power is coupled to the power supply, and operate the motor at the requested speed in response to determining that the AC power is coupled to the power supply. The controller is further configured to initiate a ramp-down operation in response to determining that the AC power is not coupled to the power supply. The ramp-down operation is configured to ramp down the speed of the motor from the requested speed over a period of time in response to determining that the AC power is not coupled to the power supply. The controller is further configured to determine whether a minimum ramp-down speed has been reached and operate the motor at the minimum ramp-down speed in response to determining that the minimum ramp-down speed has been reached.

In one aspect, the power supply is configured to charge the battery pack when AC power is coupled to the power supply.

In another aspect, the ramp-down operation reduces the speed of the motor over time using a predetermined ramp-down rate.

In another aspect, the predetermined ramp-down rate is configured to allow the battery pack to power the motor for a desired operating time.

In another aspect, the desired operating time is 90 minutes.

In another aspect, the predetermined ramp-down rate is configured to reduce the output of the portable fan by 2 CFM per minute.

Other aspects of the invention will become apparent by consideration of the detailed description and accompanying drawings.

DETAILED DESCRIPTION

Figure 1:
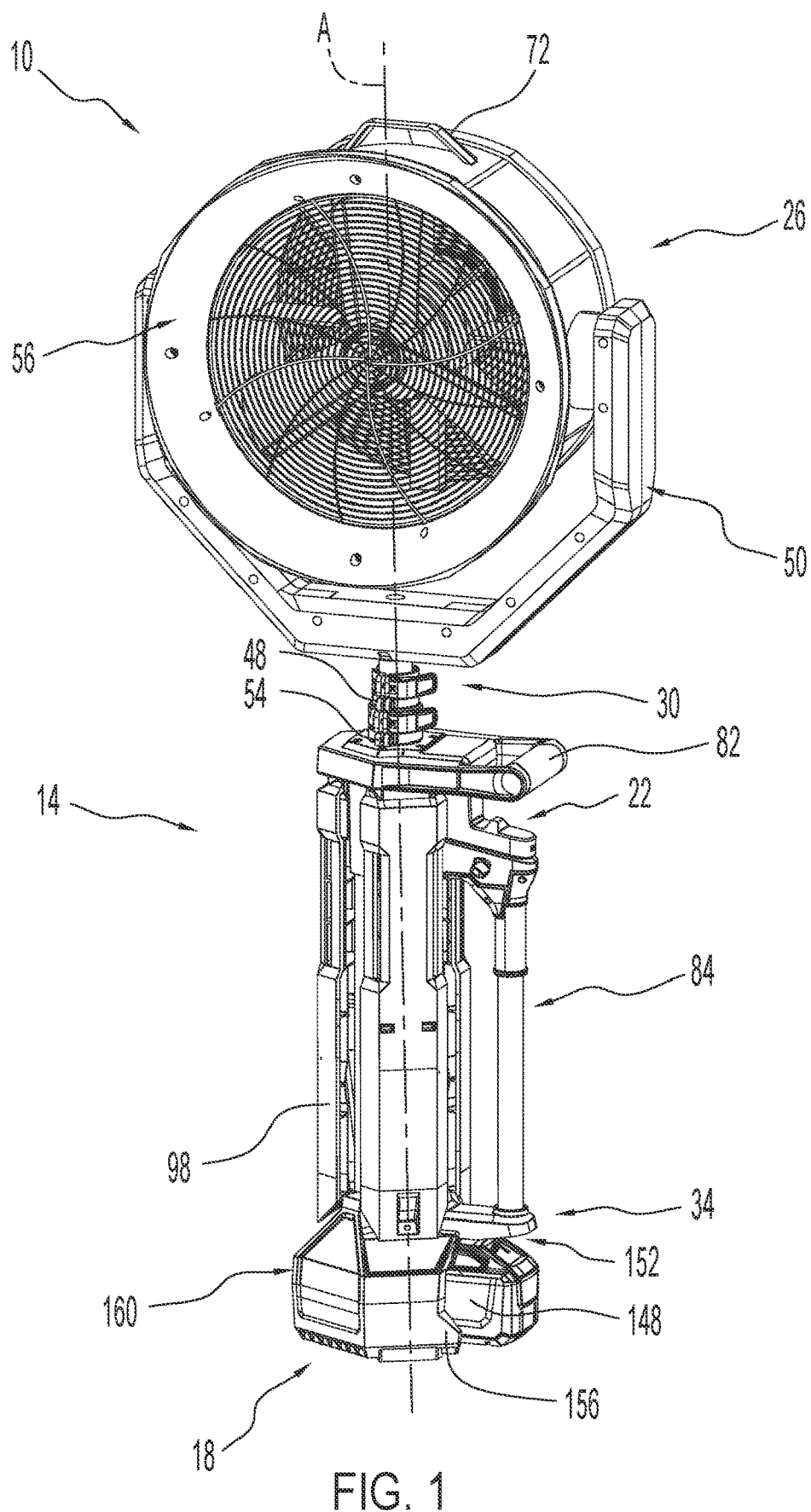
FIG. 1 is a perspective view of a portable pedestal fan, including telescoping members and a support assembly each in a collapsed position, and illustrating a fan head in one example position, according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

It should also be noted that a plurality of hardware and software-based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

Figure 2:
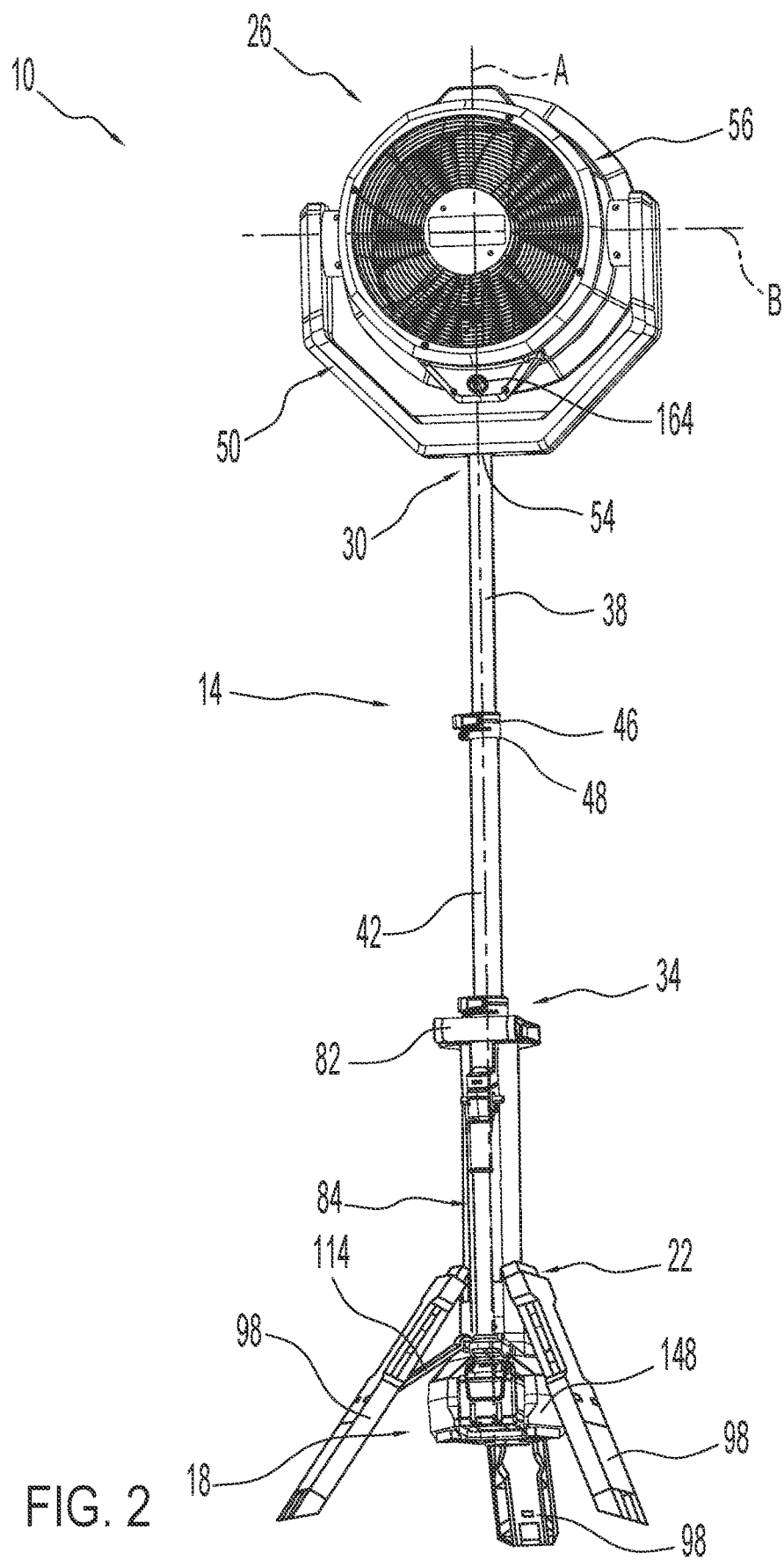
FIG. 2 is a perspective view of the pedestal fan of FIG. 1, illustrating the telescoping members and the support assembly each in an expanded position.
Figure 3C:
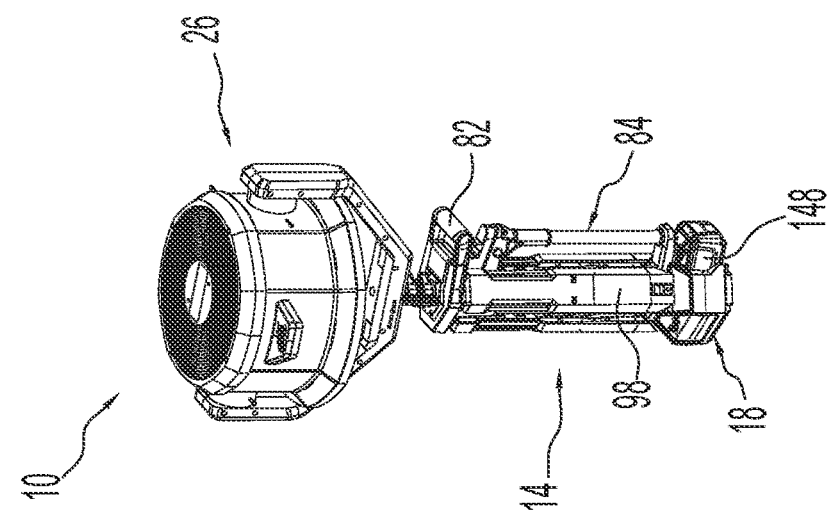
FIG. 3C another perspective view of the pedestal fan of FIG. 1, illustrating the fan head in another example position.
Figure 3B:
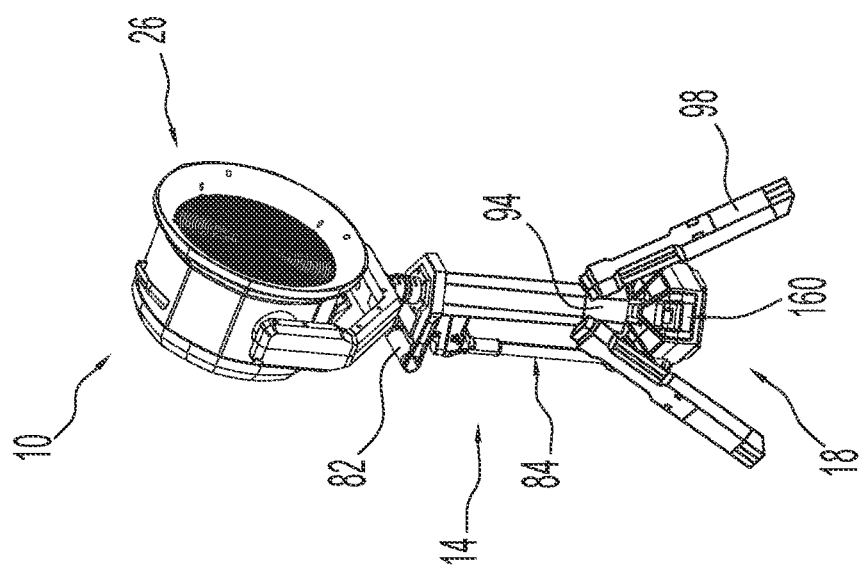
FIG. 3B is a perspective view of the pedestal fan of FIG. 1, illustrating the telescoping members in the collapsed position.
Figure 3A:
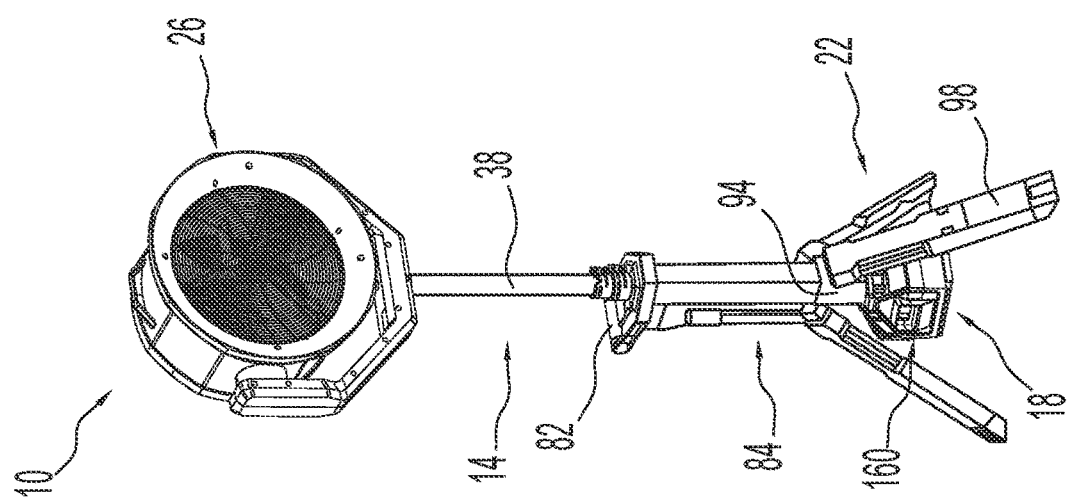
FIG. 3A is a perspective view of the pedestal fan of FIG. 1, illustrating the telescoping members in a partially expanded position.

FIGS. 1-3C illustrate a pedestal fan 10 including an elongate body 14, a base housing 18, a support assembly 22, and an operational unit such as a fan head or head assembly 26. The pedestal fan 10 is configurable in either a fully collapsed position, as shown in FIG. 1, a fully expanded, operating position, as shown in FIG. 2, a partially expanded, operating position, as shown in FIG. 3A, a partially collapsed, operating position, as shown in FIG. 3B, and a fully collapsed position, as shown in FIG. 3C. In the fully collapsed positions, the pedestal fan 10 is relatively compact for storing and transporting but could also be used while being transported (e.g., similar to a leaf or refuse blower). In the operating position, the pedestal fan 10 may be self-supported on a surface.

With continued reference to FIGS. 1-3C, the elongate body 14 includes a first, top end 30 and a second, bottom end 34 opposite the top end 30. The elongate body 14 further includes a longitudinal axis A that extends through the first end 30 and the second end 34.

With specific reference to FIG. 2, the elongate body 14 is a telescoping body that includes a plurality of elongate telescoping members, or extension poles 38, 42, to allow the body 14 to be extendable in length. The illustrated body 14 includes a first extension pole 38 and a second extension pole 42. In some embodiments, any number of extension poles 38, 42 may be used. The extension poles 38, 42 each include a longitudinal axis that is coaxial with the longitudinal axis A of the elongate body 14. Additionally, the extension poles 38, 42 are selectively secured in either an extended position (FIG. 2), a retracted position (FIG. 1), or any position in between by a clamping assembly 46 that is movable between a clamped and unclamped position. In addition, an electric cord (not shown) is contained within the elongate body 14 and the extension poles 38, 42 to electrically connect the head assembly 26 with the base housing 18 to provide power to the head assembly 26. In other embodiments, the electric cord may be external to the extension poles 38, 42.

The pedestal fan 10 may further include a wiper 48. The wiper is positioned between the extension poles 38, 42 as a spacer to inhibit the extension poles 38, 42 from automatically moving to the retracted position. The wiper 48 is arranged to contact the first extension pole 38, thereby providing friction to impede the extension poles 38, 42 from automatically moving into the retracted position unassisted, solely through the weight of the head assembly 26 (i.e., due to gravity). In the illustrated embodiment, the wiper 48 is an elastomeric annular ring member. In other embodiments, the pedestal fan 10 may include any number of wipers (e.g., one wiper between each pair of extension poles 38). Additionally, the extension poles 38, 42 may include anti-rotation elements to inhibit relative rotation between the extension poles 38, 42. The wiper 48 may be integrated with the clamping assembly 46 in some embodiments.

Figure 4:
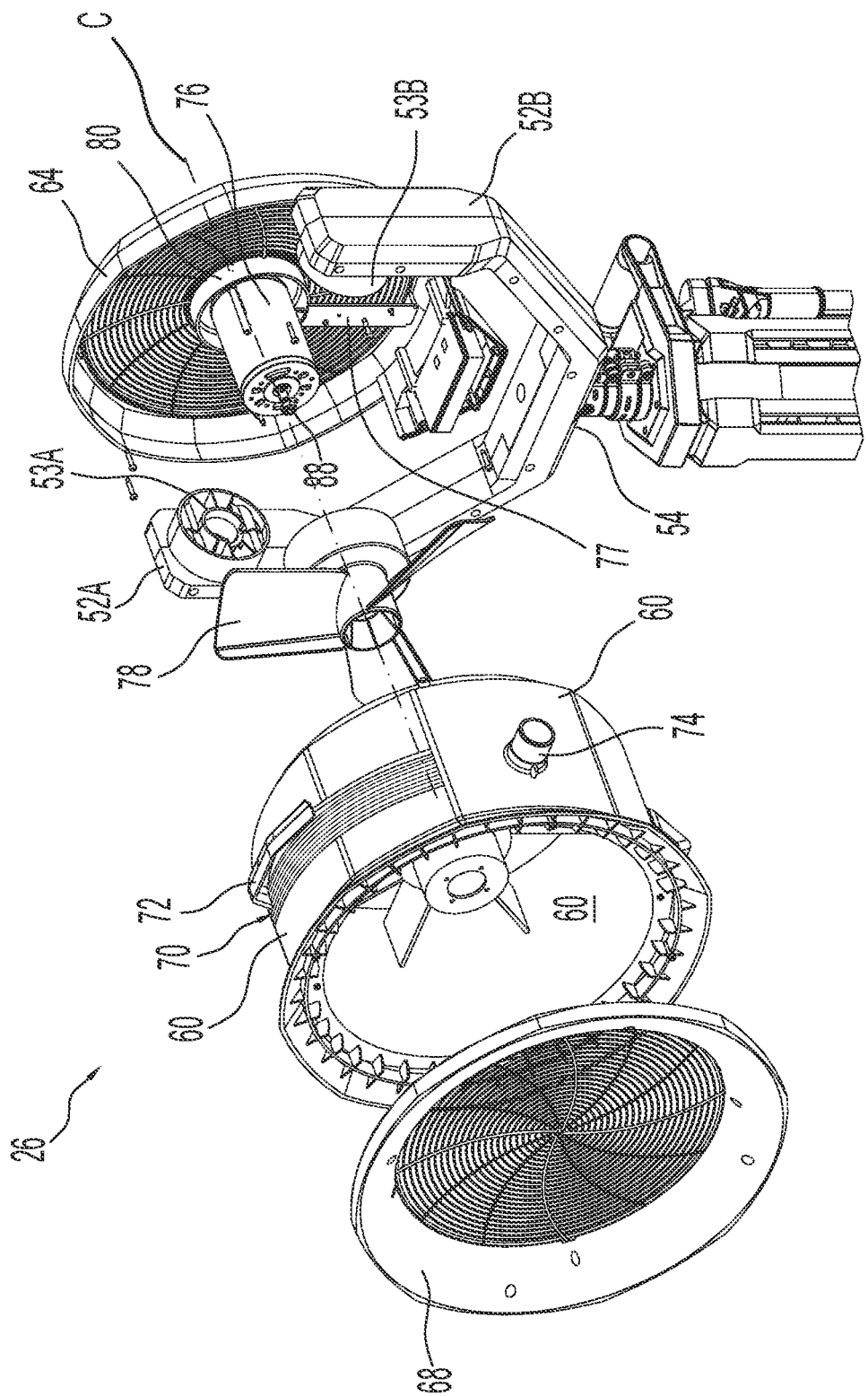
FIG. 4 is a partially exploded view of the fan head of the pedestal fan of FIG. 1, according to one example construction of the pedestal fan.

Referring now to FIGS. 1-4, the head assembly 26 includes a fan base 50 that is coupled to a distal end 54 of the first extension pole 38, thus allowing a height of the head assembly 26 to be adjustable via the extension poles 38, 42 between the extended position and the retracted position. The fan base 50 is additionally rotatably coupled to the distal end 54 of the first extension pole 38 such that the head assembly 26 is rotatable about the longitudinal axis A of the body 14. In some embodiments, the fan base 50 may also be selectively removable from the distal end 54 of the first extension pole 38. As best shown in FIG. 4, the fan base 50 of the illustrated embodiment is generally U-shaped and includes a first arm 52A that supports a first aperture 53A and second arm 52B opposite the first arm 52A that supports a second aperture 53B, the significance of which is described in greater detail below.

The head assembly 26 also includes a housing 56 that supports a shroud 60, an intake grille 64 and output grille 68 (e.g., venting, perforations, etc.), a gripping handle 72, a motor 76 supported on a motor mount 80, and one or more blades 78 rotatably driven by an output spindle 88 of the motor 76. In the illustrated embodiment, the housing 56 is generally cylindrical, although other geometries (e.g., polygonal, ovular, concave/convex, etc.) of the housing 56 are possible.

With specific reference to FIG. 4, the shroud 60 may support the grilles 64, 68 at terminating ends of the shroud 60 or at a single end of the shroud 60, and the blades 78 may be mounted within the shroud 60 to generate airflow between the grilles 64, 68. In the illustrated embodiment, the motor 76 is supported by the intake grille 64 with the spindle of the motor 76 extending forwardly into the blades 78. In other constructions, the motor 76 may be supported by the output grille 68 with the spindle of the motor 76 extending rearwardly of the blades 78. In another embodiment, the motor 76 is supported on the shroud 60 with the spindle extending either forwardly or rearwardly. In still other embodiments, the motor 76 may be supported on an exterior part of the housing 56, or even on the base 50. Regardless of construction, the motor 76 may be operated at multiple predetermined speeds in order to provide multiple modes of operation of the fan 10 assembly (e.g., high, medium, low, forward, reverse, etc.). In the illustrated embodiment, wiring to the motor 76 is routed through a conduit 77. In other embodiments, wiring to the motor 76 may be routed through a portion of the shroud 60 or grille.

With continued reference to FIG. 4, the shroud 60 may further include a vent 70. The vent 70, in one example construction, is formed in a wall of the shroud 60 and is positioned to accommodate tangential airflow to an exterior of the housing 56. The handle 72 may be moveably (e.g., slidably, rotatably, etc.) attached to the housing 56 to selectively open and close the vent 70. While the vent 70 is in a closed position, as illustrated in FIG. 3, tangential airflow is inhibited from exiting the housing 56 through the vent 70 such that substantially all the airflow, which is generated by rotation of the blades 78, travels along a central axis C, about which the blades 78 rotate, and exits the housing 56 through one of the grilles.

While the vent 70 is in an open position, as illustrated in FIG. 4, tangential airflow is permitted to exit the housing 56 through the vent 70 such that some airflow travels along the central axis C and exits the housing 56 through the grilles, while some airflow also exits through the vent 70 in a direction extending away from the central axis C, thereby allowing airflow to reach a greater portion of the surrounding environment. The vent 70 may be biased into either position, depending on the construction of the head assembly 26. In some embodiments, the handle 72 may alternatively be attached to a moveable cover that is selectively moveable to cover/uncover the vent 70. In still other embodiments, the handle 72 may alternatively be an adjustable knob that permits the vents to be opened/closed/covered/uncovered to a desired amount anywhere from 0-100%, such as 50% opened/uncovered, 90% closed/covered, etc.

With reference to FIGS. 1-4, the fan housing 56 further includes coupling pins 74 that extend from opposing sides of the fan housing 56. The coupling pins 74 are configured to fit within the first and second apertures 53A, 53B of the fan base 50 to form a pitch coupling which permits relative rotational movement between the fan housing 56 and fan base 50 about a pitch axis B, which is generally perpendicular to the longitudinal axis A. The coupling provides the fan housing 56 to be selectively rotated about the pitch axis B through a full 360 degrees. In this manner, paired with the rotational coupling between the fan base 50 and the body 14, the fan head 26 is operable through multiple degrees of freedom. Stated another way, a desired direction of airflow generated by the pedestal fan 10 may be selectable relative to a vertical and horizontal direction solely through movement of the fan head 26 (e.g., without moving the entire pedestal fan 10 while in the operating position).

In the illustrated embodiment, some friction exists within pitch and rotation couplings such that some amount of friction force must be overcome for rotation to occur. Such connections may allow the housing 56/base 50 to be rotated and held in a desired position. In some embodiments, the couplings may include mechanisms for restricting relative movement, such as a tightening knob, gear, setting screw, or the like. For example, in one example construction of the fan head 50, the coupling pins 74 and apertures 53A, 53B include complimentary detents, teeth, or the like. In other embodiments, another form of coupling could be utilized such as a magnetic coupling, a hydraulic coupling, etc.

Figure 5:
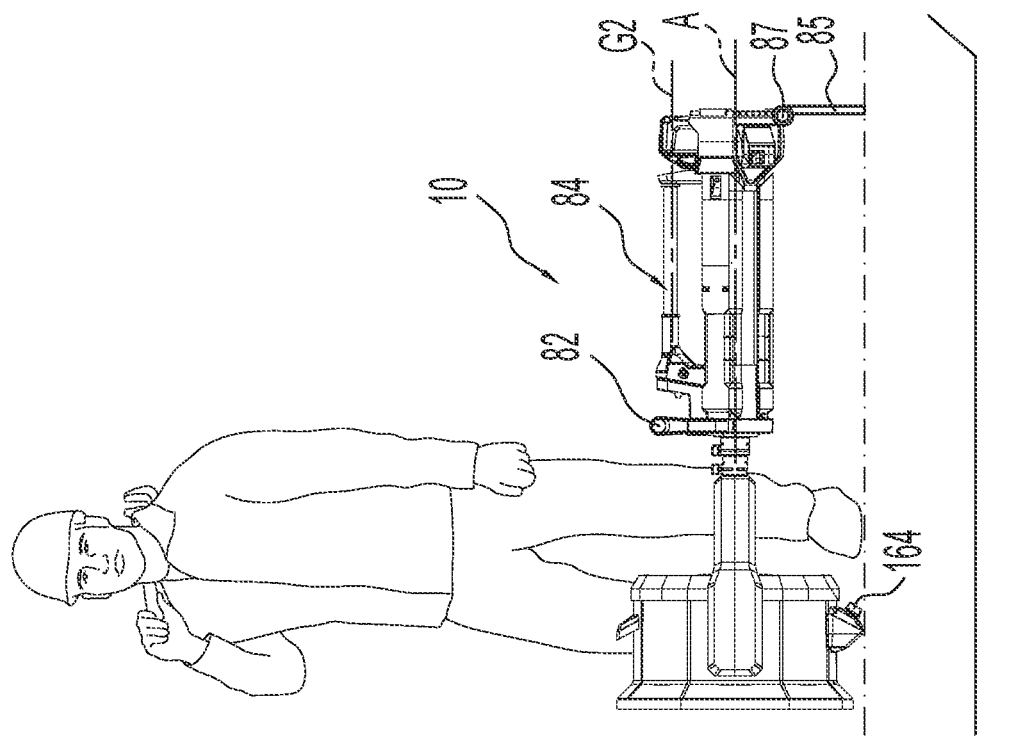
FIG. 5 is a perspective view of the pedestal fan of FIG. 1 being transported by a user, illustrating the fan head in two example positions.
Figure 5:
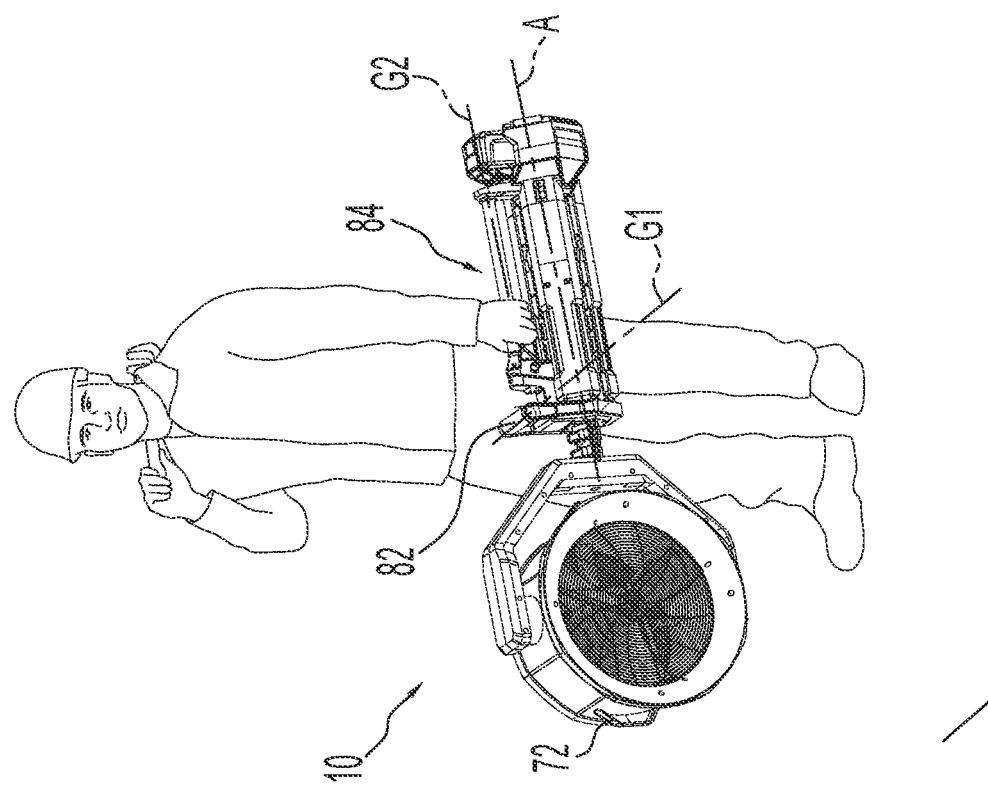

As illustrated in FIG. 5, the body 14 of the pedestal fan 10 further includes a fixed or stationary handle 82 and a handle assembly 84, either of which may be used to facilitate carrying the pedestal fan 10 when in the collapsed position. The fixed handle 82 is secured to the elongate body 14 and has a grip axis G1 that is generally perpendicular to and offset from the longitudinal axis A of the elongate body 14. In addition, the handle 82 may be overmolded to provide additional grip. The handle assembly 84 has a grip axis G2 that is generally parallel to and offset from the longitudinal axis A of the elongate body 14.

With continued reference to FIG. 5, the base housing 18 may include a kickstand 85 or another type of moveable support member configured to level the pedestal fan 10 while set in a generally horizontal position. The kickstand 85 may also protect components within the base housing 18 in case of an accidental drop of the pedestal fan 10. In the illustrated embodiment, the kickstand 85 is moveable about a hinge 87 between a stowed position and an extended position in which the kickstand 85 projects from the base housing 18 by about an amount that allows the pedestal fan 10 to be generally level.

Figure 6:
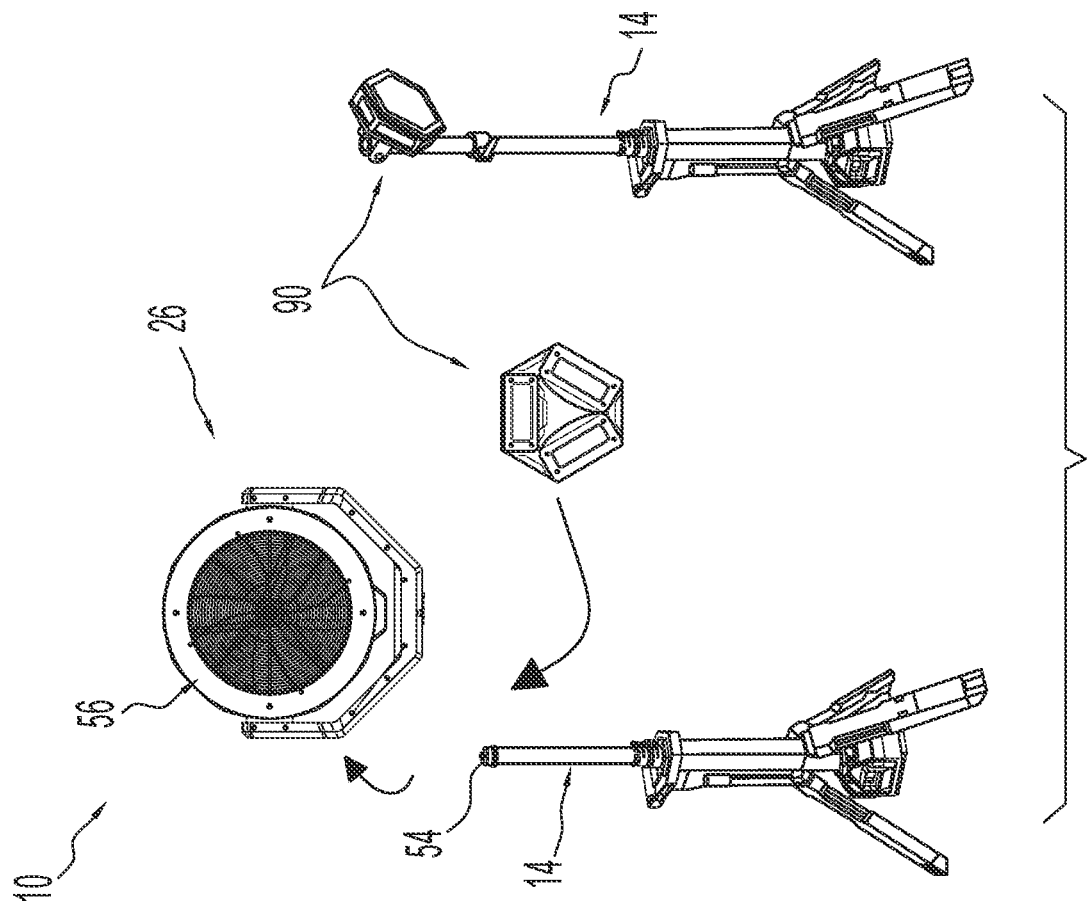
FIG. 6 is a perspective view of an alternative operational head unit for use with the support assembly and telescoping members of the pedestal fan of FIG. 1, according to one example construction, in which the alternative operational head unit includes light modules.

FIG. 6 illustrates light head assemblies 90 that may be used with the pedestal fan 10 in place of the fan head assembly 26 or fan housing 56. The light head assemblies 90 may include a plurality of light emitting diodes (LEDs) arranged in an array to provide uniform illumination of an area, three independent light heads that are each pivotably coupled between a pair of hinge lobes, or other various light sources. The light head assemblies 90 and the fan head assembly 26 may each be interchangeable/removably coupled to the body 14 depending on a desired application. The alternative light head assemblies 90 could further be attached directly to the fan base 50 in place of the fan housing 56.

Figure 7:
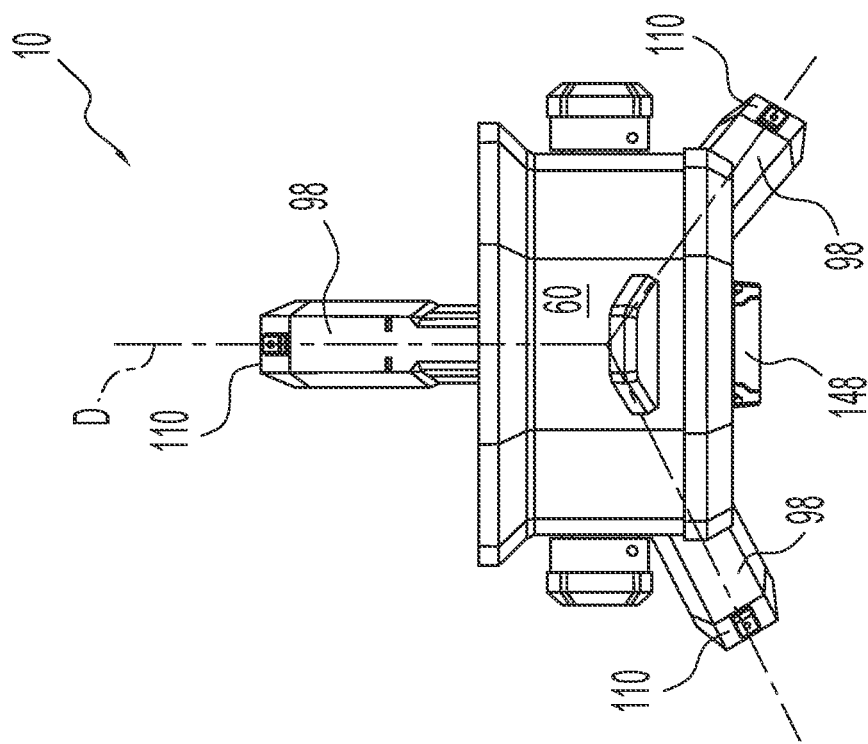
FIG. 7 is a top perspective view of the pedestal fan of FIG. 2.
Figure 8:
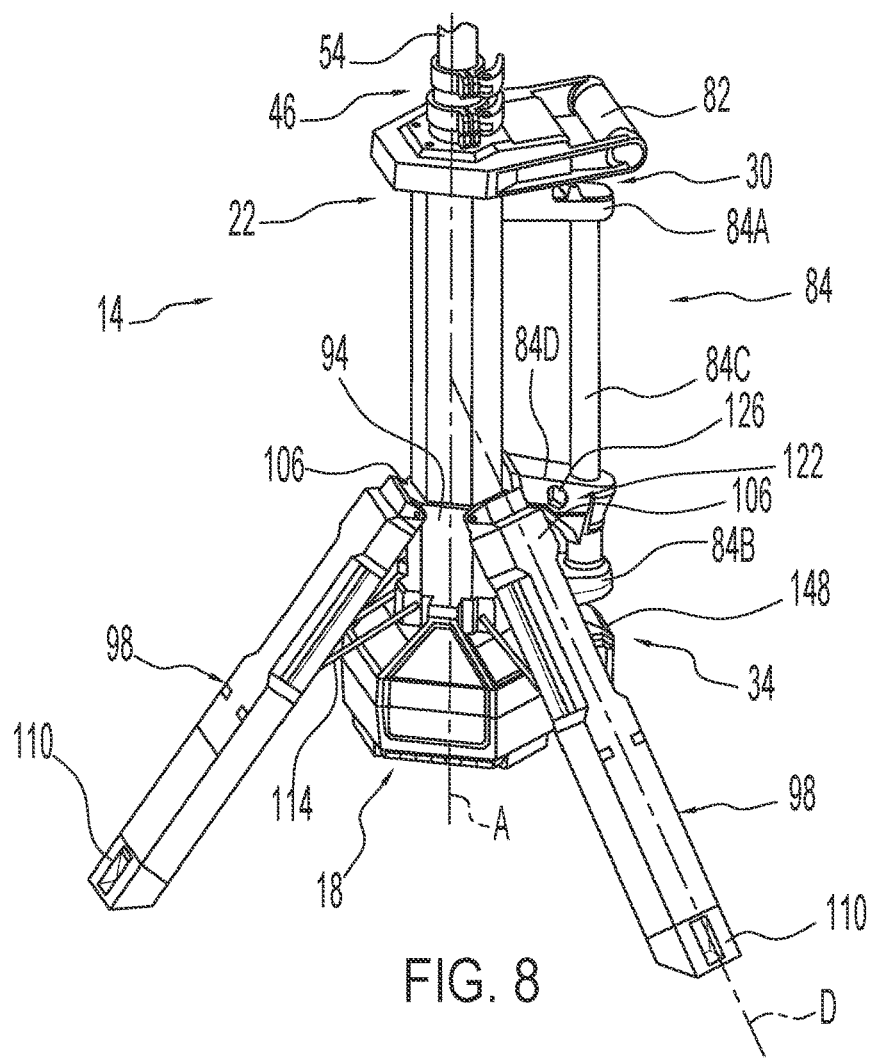
FIG. 8 is an isolated perspective view of the support assembly of the pedestal fan of FIG. 1.

As illustrated in FIGS. 7 and 8, the support assembly 22 includes a collar 94, the handle assembly 84, and three legs 98 circumferentially spaced equidistant around the elongate body 14 by about 120 degrees. In alternate embodiments, the support assembly 22 may include any number of legs 98 spaced in various arrangements. The collar 94 is coupled around a portion of the elongate body 14 and is movable (e.g., slidable) along the elongate body 14 in directions parallel to the longitudinal axis A. The handle assembly 84 may include rigid upper and lower portions 84A, 84B, a stem 84C extending between the rigid portions along the handle 72 axis G2, and a moveable portion 84D slidable along the stem 84C. The rigid portions 84A, 84B may be rigidly coupled to the support assembly 22, while the moveable portion 84D may be coupled to the collar 94 and slidable on the stem 84C. In this manner, the collar 94 is moveable along the body 14 simultaneously with the moveable portion 84D on the stem 84C. Stated another way, the collar 94 and moveable portion 84D of the handle assembly 84 may move together as one member parallel to the longitudinal axis A.

Each of the legs 98 is hingedly coupled to the collar 94 at a first end 106 to allow a second end 110 to be pivoted away from the body 14. In addition, each of the legs 98 is pivotally coupled to the body 14 by a leg link 114, which limits the outward pivotal movement of the legs 98. The legs 98 are connected to the collar 94 and the leg links 114 such that, when the collar 94 is adjacent the first end 30 of the body 14, the pedestal fan 10 is in the collapsed position (FIG. 1), in which an axis D of each of the legs 98 is generally parallel with the axis A of the body 14. When the collar 94 is adjacent the lower end 34 of the body 14, the pedestal fan 10 is in the expanded, operating position (FIG. 2), in which the legs 98 are pivoted away from the body 14 such that each of the axes D of the legs 98 forms an acute angle with the axis A of the body 14.

Figure 9:
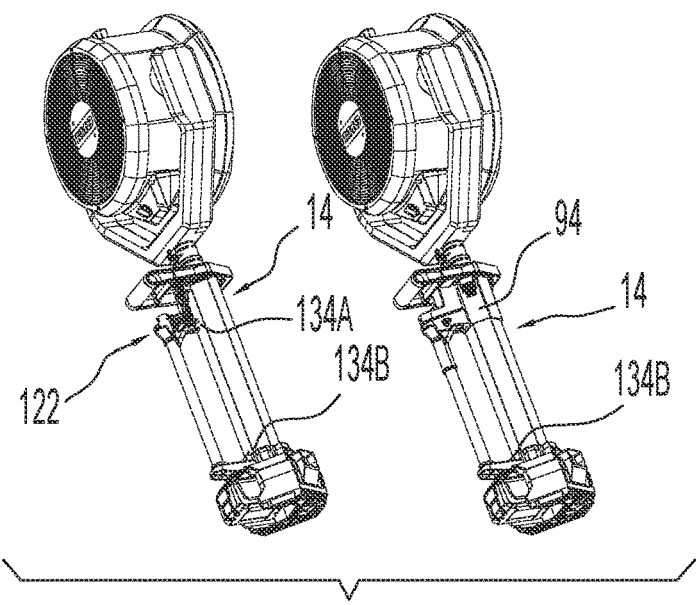
FIG. 9 is a perspective view of the pedestal fan of FIG. 1 with the fan head and legs of the support assembly partially hidden, illustrating a collar and an aperture below the collar.
Figure 10:
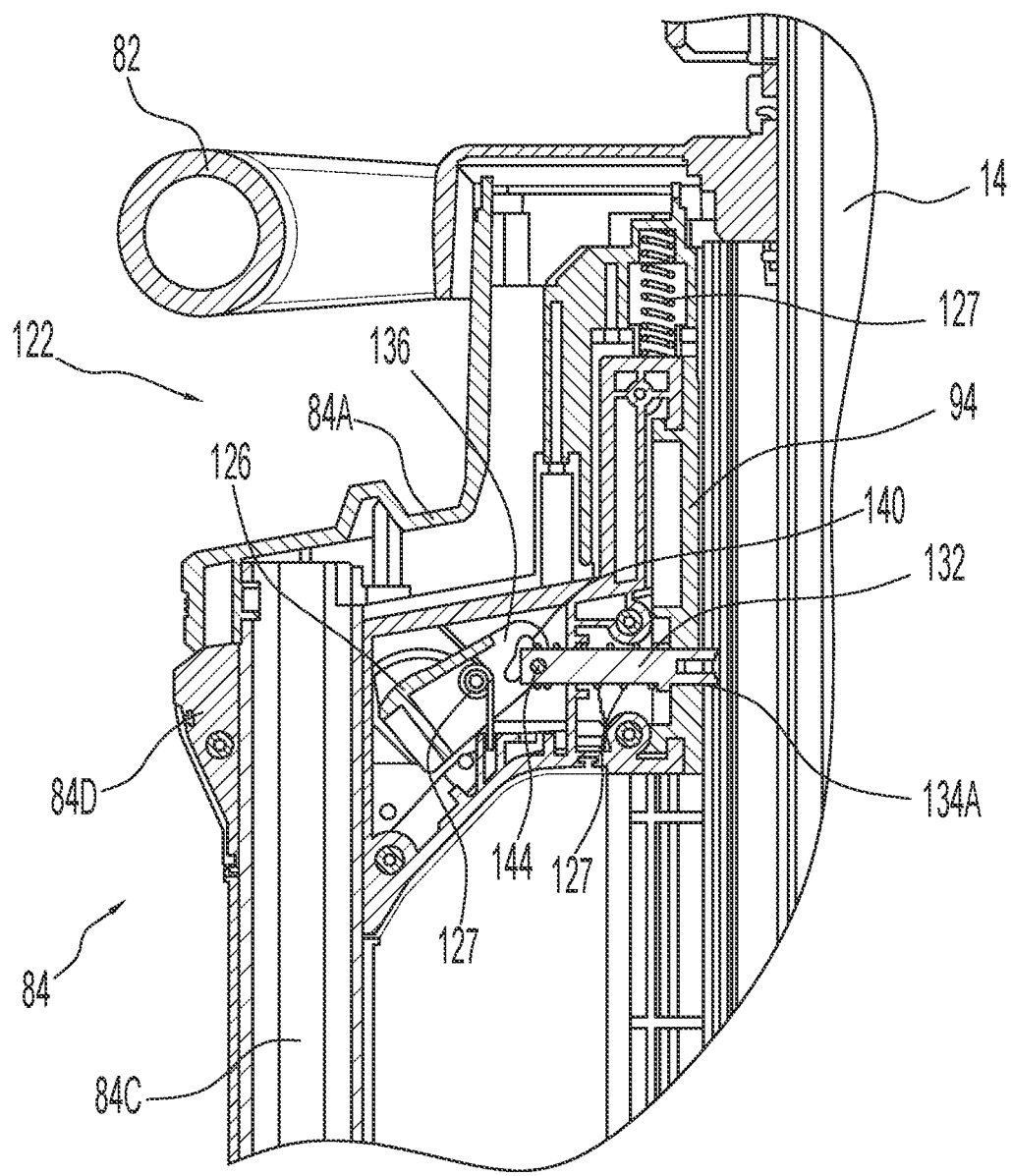
FIG. 10 is an enlarged cross-sectional view of a locking assembly of the pedestal fan taken along line A of FIG. 1, illustrating the locking assembly in a locked position.

Referring now to FIGS. 8-10, the moveable portion 84D of the handle assembly 84 includes a locking assembly 122 having an actuator 126, one or more springs 127, and a locking member or pin 132 (FIG. 10). As best illustrated in FIG. 9, the elongate body 14 includes an upper aperture 134A adjacent the first end 30 of the body 14, and a lower aperture 134B adjacent the lower end 34 of the body 14. In the illustrated embodiment, the locking assembly 122 is supported by the moveable portion 84D of the handle assembly 84 and, in some embodiments, the collar 94.

The locking assembly 122 further includes a cam member 136 having a cam surface 140, and a cam riding pin 144 supported by the locking pin 132. In the illustrated embodiment, the cam member 136 is integral to the actuator 126, although in other embodiments, the cam member 136 and the actuator 126 may be separate pieces. The actuator 126 and at least one spring 127 are arranged to bias the locking pin 132 into a locking position (FIG. 10). As shown in FIG. 9, the apertures 134A, 134B are positioned to selectively receive the locking pin 132 in the locking position to retain the pedestal fan 10 in different positions/configurations. The collar 94 additionally includes an aperture or through hole that is complimentary to the apertures 134A, 134B on the elongate body 14 such that the locking pin 132 extends through the collar 94 while remaining extendable/retractable to the elongate body 14.

As described above, the collar 94 and moveable portion 84D of the handle assembly 84 may be moved as a similar body 14. In one example transition of the pedestal fan 10 from the collapsed position to the expanded position, the actuator 126 may be operated against a biasing force to retract the locking pin 132 from the upper aperture 134A of the body 14. Once the locking pin 132 is retracted from the upper aperture 134A, the collar 94 and moveable portion 84D may be moved a small amount along the longitudinal axis A. The actuator 126 may then be released, which biases the locking pin 132 toward the elongate body 14. While grasping the handle 72 and the moveable portion 84D of the handle assembly 84, the collar 94 and locking assembly 122 may be moved away from the handle 72 to thereby extend the legs 98 and move the pedestal fan 10 to the expanded position. Once the collar 94 and locking assembly 122 have been moved a sufficient amount, the locking pin 132 may, in response from the biasing force, snap into the lower aperture 134B on the elongate body 14 to lock the pedestal fan 10 in the expanded position. To collapse the pedestal fan 10, the actuator 126 is similarly depressed/operated against the biasing force to retract the pin 132 from the lower aperture 134B, thereby allowing the collar 94 and locking assembly 122 to be moved generally toward the handle 72 and into the collapsed position.

With reference to FIGS. 1-10, the base housing 18 is positioned at the second end 34 of the body 14 and includes a battery pack interface defining a receptacle 156 that receives a battery pack 148 to power the pedestal fan 10. The base housing 18 may further include a power module 160 that is electrically connected to the fan head 26. The battery pack 148 provides direct current (DC) power to the pedestal fan 10. The battery pack 148 may be electrically connected to the power module 160. The battery pack 148 further includes a latching mechanism 152 to secure the battery pack 148 within the receptacle 156 of the base housing 18.

The base housing 18 may also include a power inlet (not shown) to connect the pedestal fan 10 to an AC power source, such as a wall outlet or generator, to power the fan 10. In some embodiments, the base housing 18 may also include a power outlet (not shown). The power outlet may connect the fan 10 to another device (e.g., a power tool) to power that device. In some configurations, the power outlet may connect to another pedestal fan 10 (or light) so that a series of fan 10/lights can be daisy-chained together.

The battery pack 148 may be a power tool battery pack generally used to power a power tool, such as an electric drill, an electric saw, and the like (e.g., an 18-volt rechargeable battery pack 148, or an M18 REDLITHIUM battery pack 148 sold by Milwaukee Electric Tool Corporation). The battery pack 148 may include lithium ion (Li-ion) cells. In alternate embodiments, the battery packs may be of a different chemistry (e.g., nickel-cadmium (NiCa or NiCad), nickel-hydride, and the like). In the illustrated embodiments, the battery pack 148 is an 18-volt battery pack. In alternate embodiments, the capacity of the battery pack 148 may vary (e.g., the battery pack 148 may be a 4-volt battery pack, a 28-volt battery pack, a 40-volt battery pack, or battery pack of any other voltage). The battery pack 148 may further include an indicator to display the current state of charge of the battery pack 148 and/or other characteristics of the battery pack 148.

As best shown in FIG. 2, the pedestal fan 10 may include a user interface 164 (e.g., actuator, switch, dial, etc.) operable to control power to the pedestal fan 10, including the motor 76. The user interface 164 is operable to allow a user to select an output setting of the motor 76 (e.g., HIGH, MEDIUM, LOW). The user interface 164 further includes a plurality of power level indicators that correspond to the output setting of the motor 76 (i.e., speed of fan blades 78). In some embodiments, the fan 10 may further include a radio transceiver (e.g., using radio frequencies) or optical transceiver (e.g., infra-red transceiver) configured to communicate with a wireless device, such as a smartphone, a tablet computer, a laptop computer, or handheld device via a wireless connection such as, Bluetooth, cellular, Near-Field-Communication, Wi-Fi, and the like.

Figure 11:
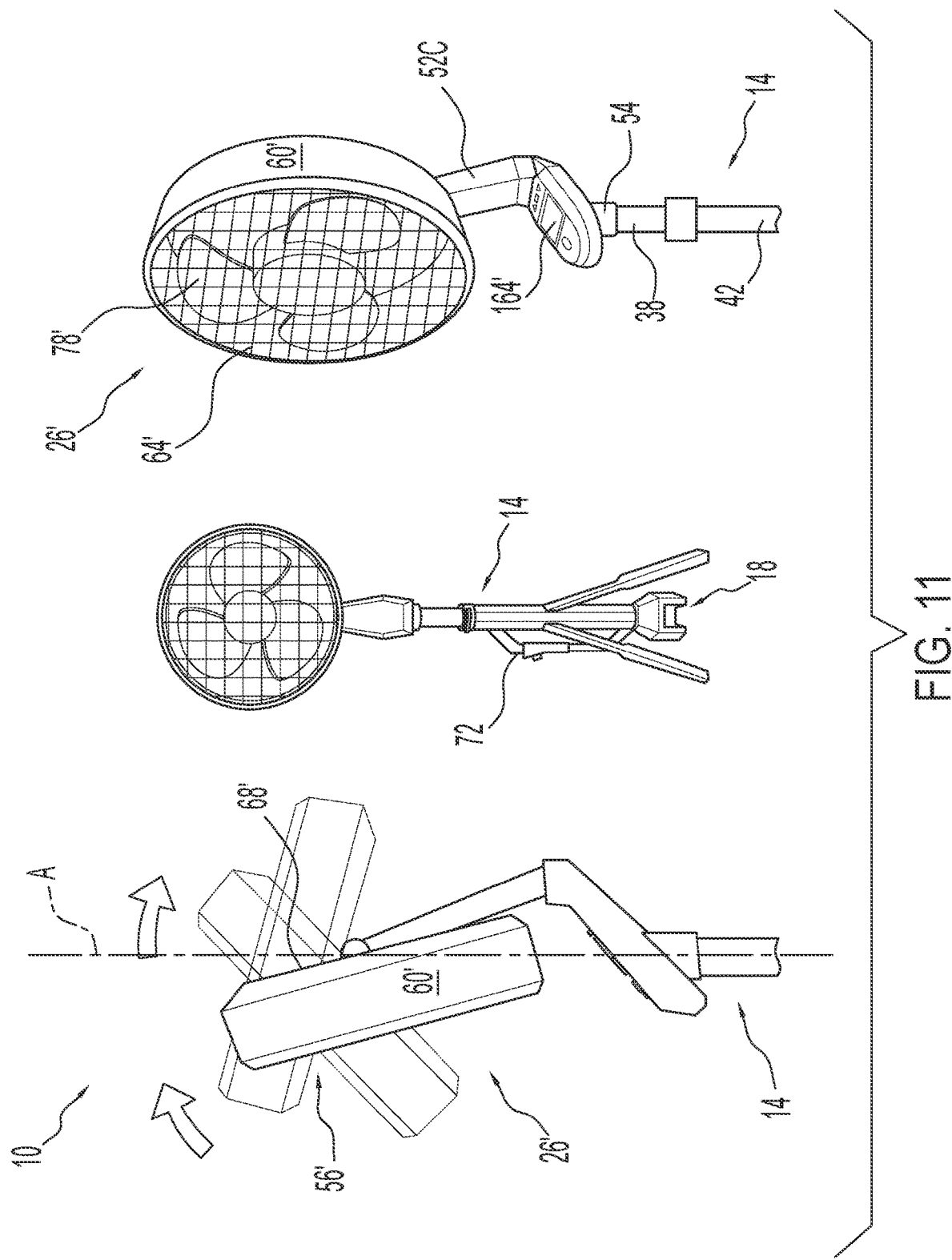
FIG. 11 is a perspective view of an alternative fan head unit for use with the support assembly and telescoping members of the pedestal fan of FIG. 1, according to one example construction.

FIG. 11 illustrates an alternative fan head assembly 26' according to another example construction of the pedestal fan 10. The alternative fan head assembly 26' is substantially similar to the fan head assembly 26 and is removably attachable to the body 14. Particularly, the fan head assembly 26' includes a housing 56', a shroud 60', one or more grilles 64', 68', a motor (not shown), and blades 78'.

One example difference between the fan head 26 and alternative fan head 26' is that the fan head 26' may include a single arm 52C that rotatably supports a housing 56' such that a pitch of the housing 56' is adjustable across the longitudinal axis A. The fan head 26' may also similarly be rotatably coupled to the body 14 to rotate about the longitudinal axis A. As further shown in FIG. 11, the fan head 26' may support a user interface 164' in place of or in addition to the user interface 164.

Figure 12:
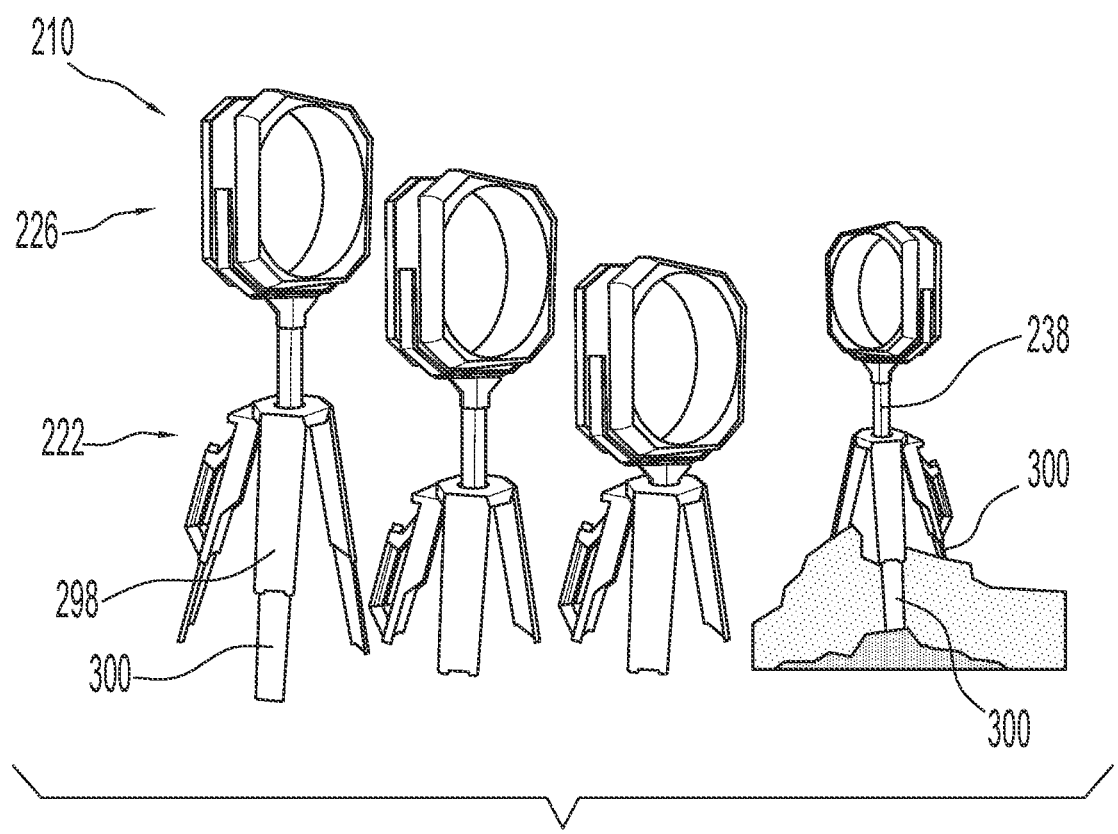
FIG. 12 is a perspective view of a pedestal fan in a plurality of possible configurations, according to another embodiment.
Figure 13:
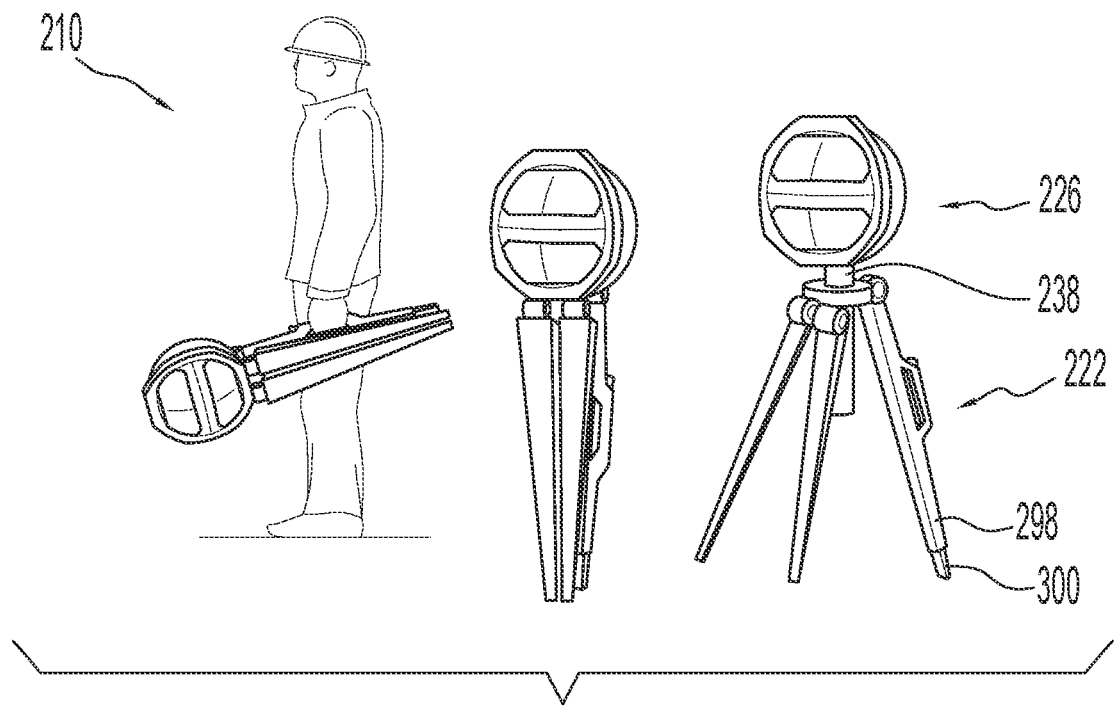
FIG. 13 is a perspective view of a portable pedestal fan in a plurality of possible configurations, including a standable configuration and a carriable configuration, according to another embodiment.

FIGS. 12 and 13 illustrate a pedestal fan 210 according to another embodiment. The pedestal fan 210 of FIGS. 12 and 13 is similar to the pedestal fan 10 described above with reference to FIGS. 1-11, and similar features are identified with similar reference numbers, plus "200." Some differences between the pedestal fan 10 and the pedestal fan 210 are described.

The pedestal fan 210 includes a support assembly 222 and a head assembly 226. The support assembly 222 includes three or more legs 298 that are moveable between an expanded position and a collapsed position. The legs 298 may further include feet 300 that may be rotatably or slidably coupled to the legs 298. In other embodiments, the feet 300 may be integrally formed on the legs 298.

As shown in FIG. 12, the feet 300 may adjustable relative to the legs 298 to accommodate standing of the pedestal fan 210 on uneven or unlevel ground. In the illustrated embodiment, according to one example application, each of the feet 300 is extendable from each of the legs 298 by an independent amount relative to the other of the feet 300. The pedestal fan 210 may further include one or more extension poles 238 that form a height adjustable telescoping assembly upon which the head assembly 226 may be removably attached.

Figure 14:
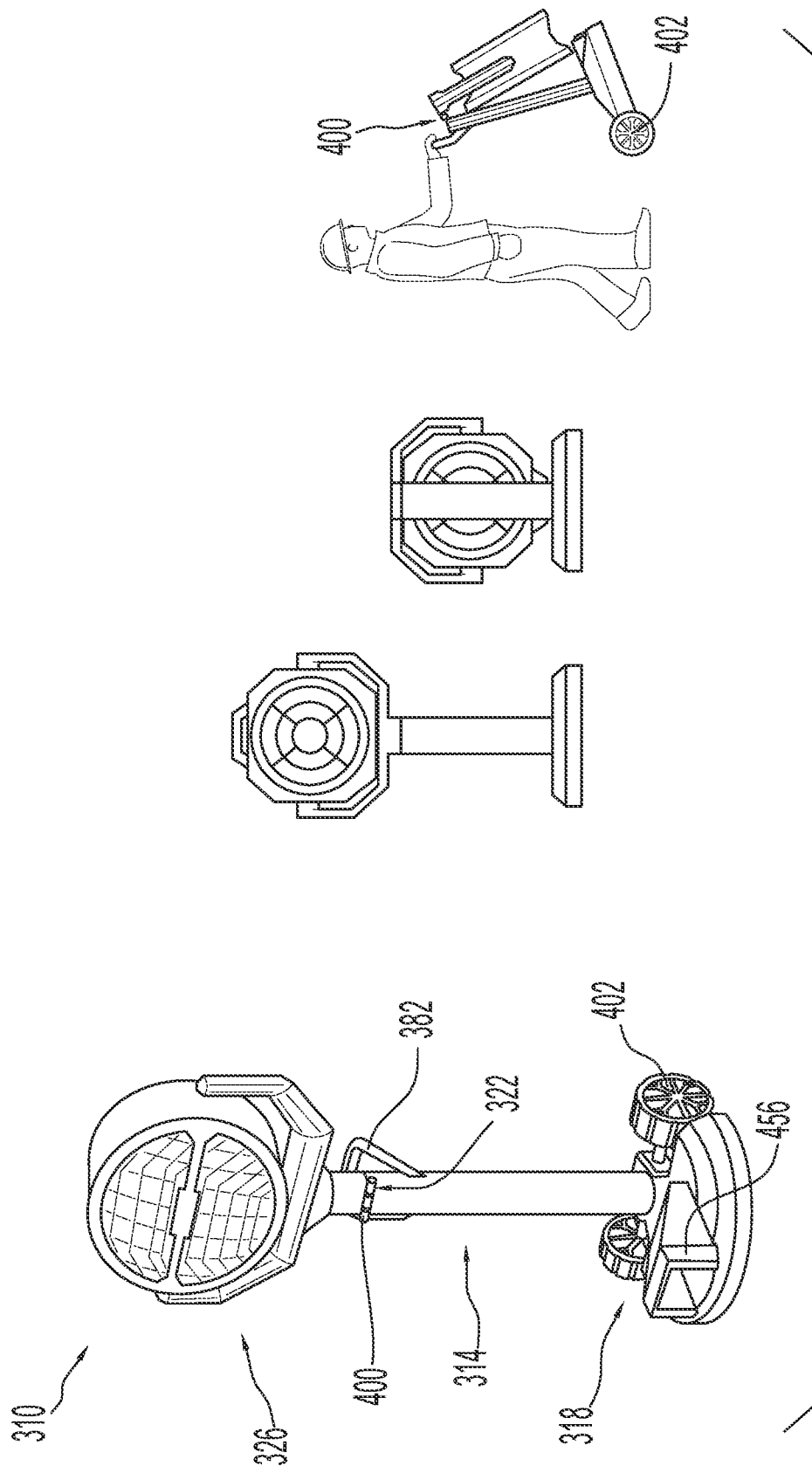
FIG. 14 is a perspective view of a portable pedestal fan in a plurality of possible configurations, including a standable configuration and a rollable configuration, according to another embodiment.

FIG. 14 illustrates a pedestal fan 310 according to another embodiment. The pedestal fan 310 of FIG. 14 is similar to the pedestal fan 10 described above with reference to FIGS. 1-11, and similar features are identified with similar reference numbers, plus "300." Some differences between the pedestal fan 10 and the pedestal fan 310 are described.

The pedestal fan 310 includes a body 314, a base 318, a support assembly 322, and a head assembly 326 substantially similar to the head assembly 26. The body 314 may be a single elongated member attached to the base 318 at one end and to the support assembly 322 at another end. As shown in FIG. 14, the support assembly 322 may be moveably coupled to the body 314 about a hinge 400 that facilities collapsing of the pedestal fan 310 into a collapsed rollable position.

As further shown in FIG. 14, the base 318 may include one or more rotatable ground engaging elements or wheels 402 that permit the pedestal fan 310 to be rolled in either an expanded position or the collapsed rollable position. A handle 382 may be mounted to a portion of the body 314 to act as a pulling or pushing handle graspable by a user to transport the pedestal fan 310. The base 318 may further include a battery receptacle or recess 456 configured to selectively receive a power tool battery pack 458.

Figure 15:
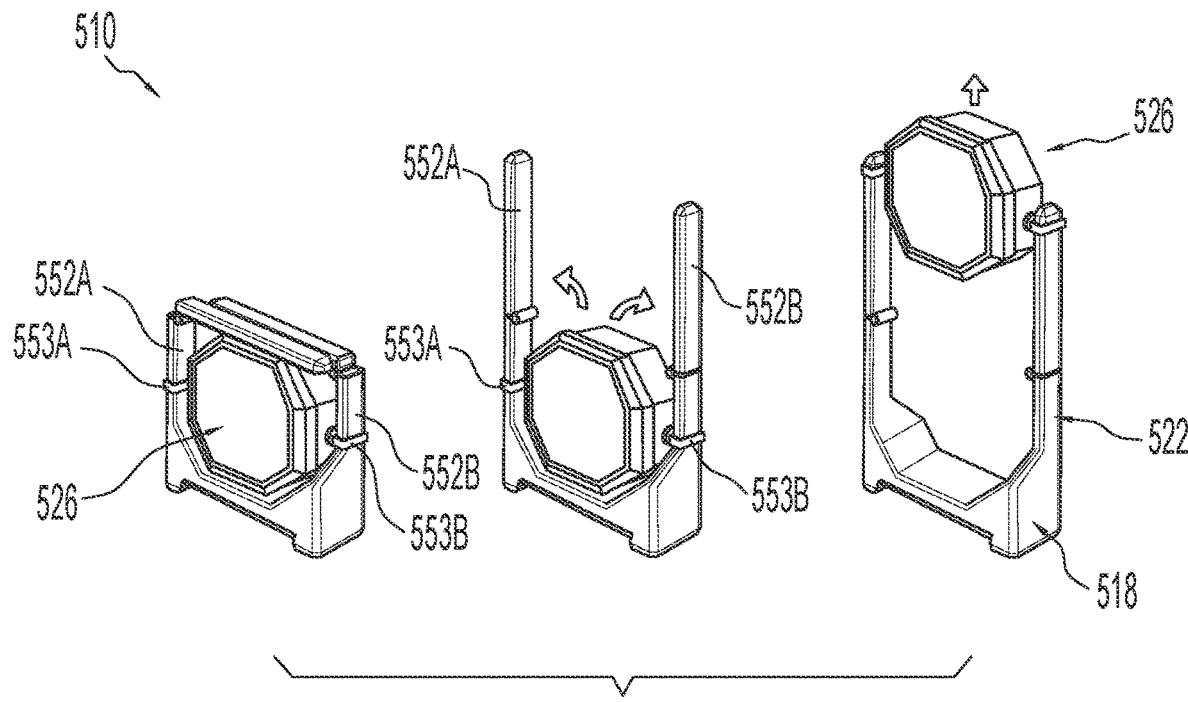
FIG. 15 is a perspective view of a portable pedestal fan in a plurality of possible configurations, including a low-height collapsed configuration and high-height expanded configuration, according to another embodiment.

FIG. 15 illustrates a pedestal fan 510 according to another embodiment. The pedestal fan 510 of FIG. 15 is similar to the pedestal fan 10 described above with reference to FIGS.

1-11, and similar features are identified with similar reference numbers, plus "500." Some differences between the pedestal fan 10 and the pedestal fan 510 are described.

The pedestal fan 510 includes a base 518, a support assembly 522, and a head assembly 526. The base 518 may be configured to nestably receive a lower part of the head assembly 526 while in a collapsed position. The support assembly 522 may extend upwardly from opposing sides of the base 518. The support assembly 522 may further include a first arm 552A and an opposing second arm 552B that are pivotally mounted thereon.

The arms 552A, 552B are swingable between a first collapsed position in which the arms 552A, 552B cover an upper portion of the head 526 and a second extended position in which the arms 552A, 552B extend upwardly away from the base 518. A first aperture 553A may be formed on the head 526 to slidably receive the first arm 552A, while a second aperture 553B may be formed on the head 526 to receive the second arm 552B. Sliding engagement between the arms 552A, 552B and apertures 553A, 553B allow for height adjustment of the head 526 relative to the base 518.

Figure 16:
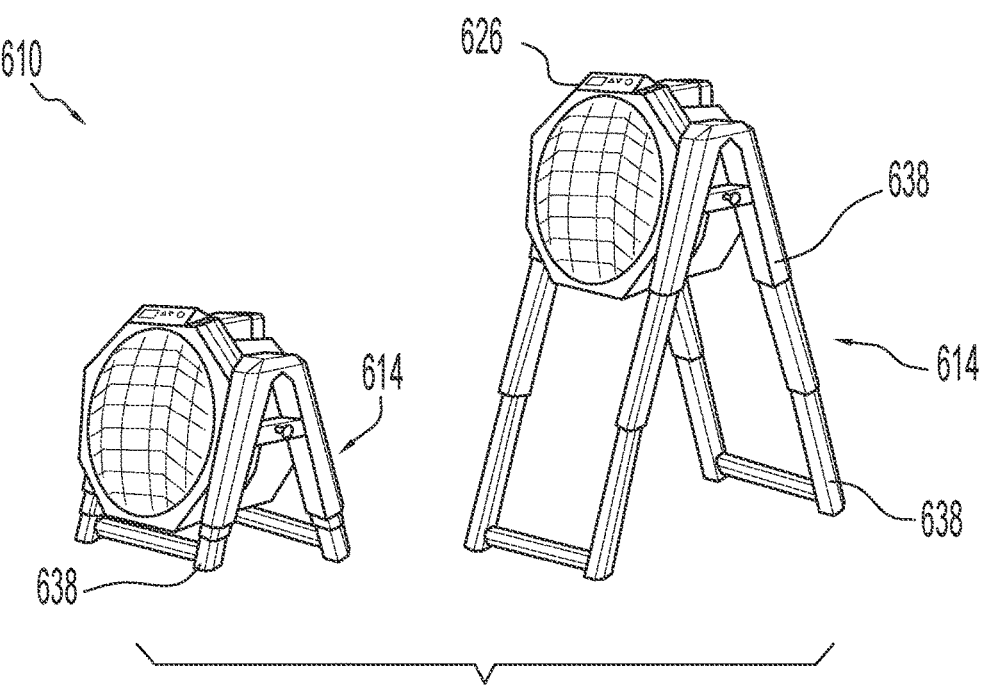
FIG. 16 is a perspective view of a portable pedestal fan in a plurality of possible configurations, including a low-height collapsed configuration and high-height expanded configuration, according to another embodiment.

FIG. 16 illustrates a pedestal fan 610 according to another embodiment. The pedestal fan 610 of FIG. 16 is similar to the pedestal fan 10 described above with reference to FIGS. 1-11, and similar features are identified with similar reference numbers, plus "600." Some differences between the pedestal fan 10 and the pedestal fan 610 are described.

The pedestal fan 610 includes a telescoping body 614 attached to a head assembly 626. The body 614 may include multiple telescoping extension poles 638 configured to selectively put the pedestal fan 610 in a low height or collapsed position and a high height or expanded position. In other embodiments, the extension poles 638 are adjustable in multiple directions (e.g., toward one another). In still other embodiments, the head 626 is rotatably coupled to the one or more extension poles 638 and/or the body 614.

Figure 17:
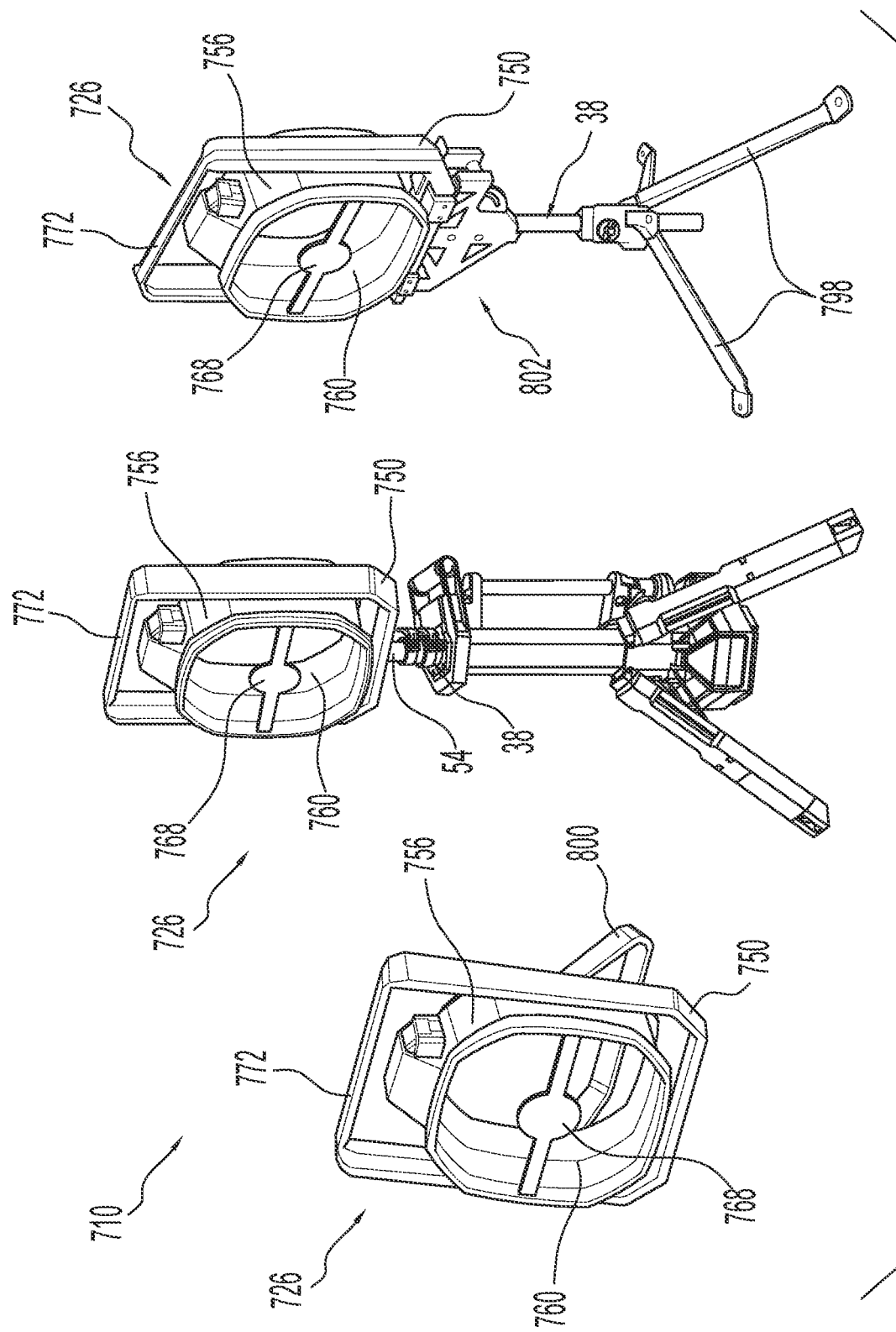
FIG. 17 is a perspective view of an alternative fan head unit for selective use with the support assembly and telescoping members of the pedestal fan of FIG. 1, according to one example construction, illustrating a plurality of possible configurations while the fan head unit is detached from the fan support and telescoping members, including an upright configuration and a tilted configuration.

FIG. 17 illustrates a pedestal fan 710 according to another embodiment. The pedestal fan 710 of FIG. 17 is similar to the pedestal fan 10 described above with reference to FIGS. 1-11, and similar features are identified with similar reference numbers, plus "700." Some differences between the pedestal fan 10 and the pedestal fan 710 are described.

The pedestal fan 710 includes a head assembly 726 that may be removably coupled to the distal end 54 of the extension pole 38 of FIGS. 1-11. The head assembly 726 may include a fan base 750, a housing 756 rotatably supported by the base 750, a shroud 760, and one or more grilles 768. The fan base 750 may also function as a gripping handle 772 for the head assembly 726 and may further include a stand 800 rotatably supported to the base 750. The stand 800 is configured to support the fan head assembly 726 on a surface when the fan head 726 is detached from the extension pole 38.

The pedestal fan 710 may further include a clamp assembly 802 for accommodating detachment and attachment of the head assembly 726 to/from the extension pole 38. The pedestal fan 710 may even further include legs 798 that are rotatably supported on a body 714, as opposed to slidably supported, such as the legs 98.

Figure 18:
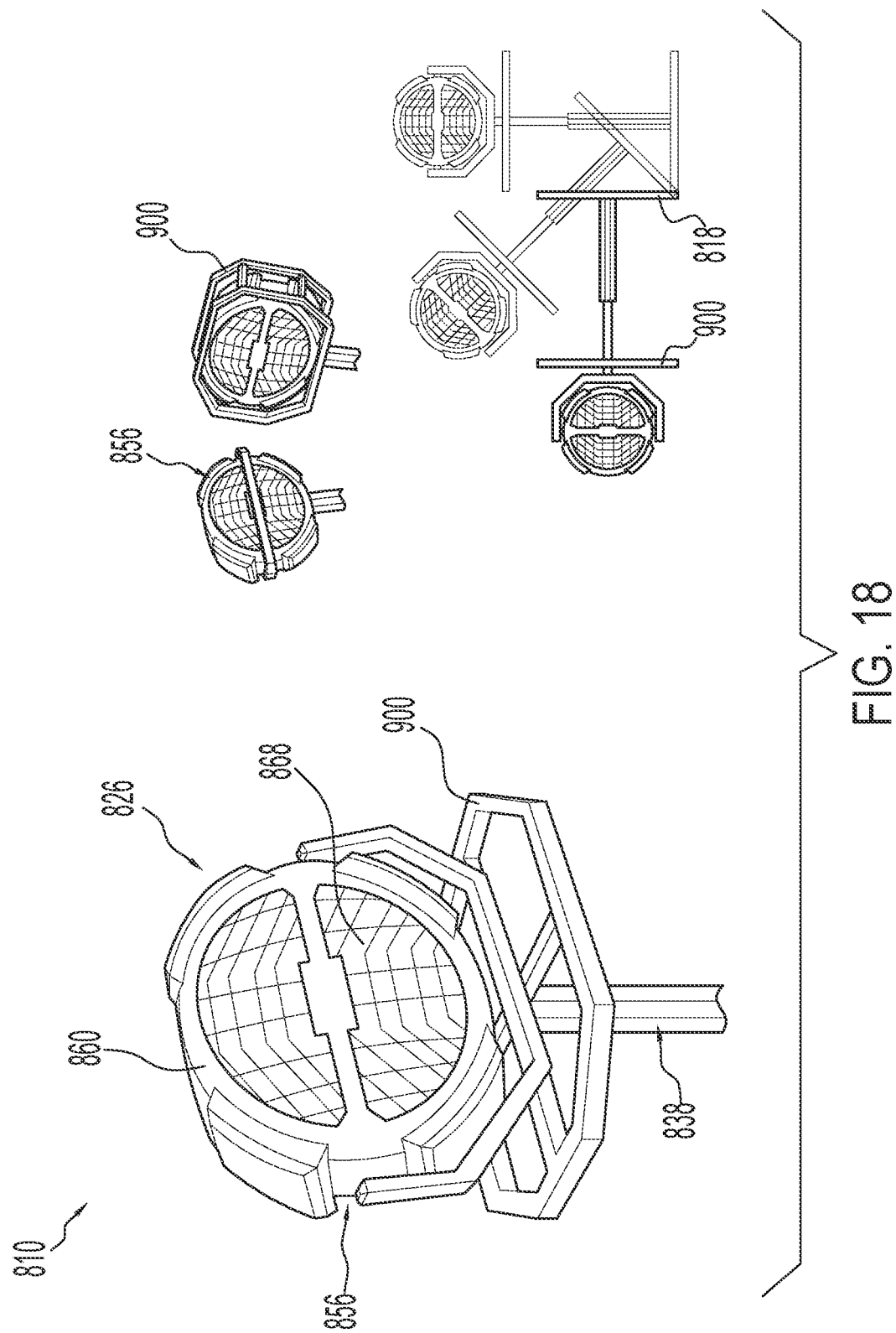
FIG. 18 is a perspective view of an alternative fan head unit for use with the support assembly and telescoping members of the pedestal fan of FIG. 1, including a protective cage, according to one example construction.

FIG. 18 illustrates a pedestal fan 810 according to another embodiment. The pedestal fan 810 of FIG. 18 is similar to the pedestal fan 10 described above with reference to FIGS. 1-11, and similar features are identified with similar reference numbers, plus "800." Some differences between the pedestal fan 10 and the pedestal fan 810 are described.

The pedestal fan 810 includes a head assembly 826 that may be removably coupled to an extension pole 838. The head assembly 826 may include a protective frame 900 that extends around the head assembly 826 and outwardly from the head assembly 826 to protect the components of the fan head 826, such as a shroud 860, grille 868, or the like. As shown in FIG. 18, the pedestal fan 810 may further include a base 818 that extends outwardly by a similar amount relative the protective frame 900. In some embodiments, the head assembly 826 may include a fan housing 856 that may selectively be retained in or extended from the protective frame 900.

Figure 19:
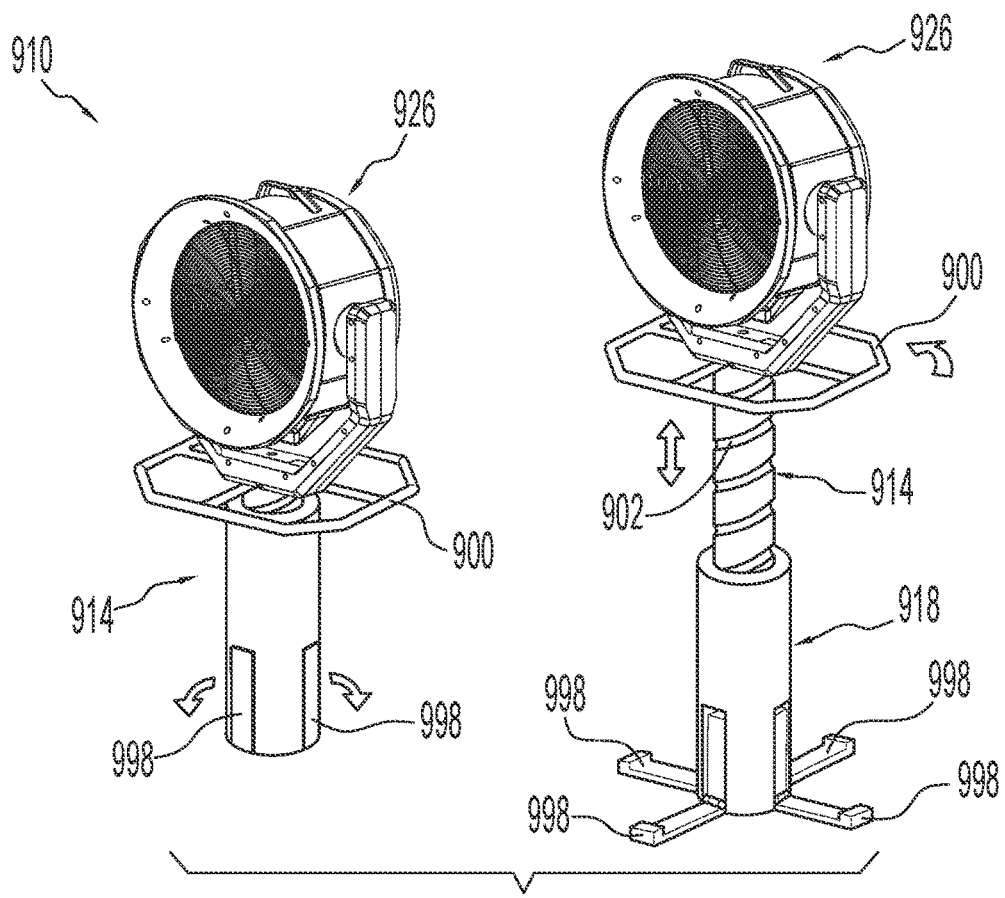
FIG. 19 is a perspective view of a portable pedestal fan in a plurality of possible configurations, according to another embodiment.

FIG. 19 illustrates a pedestal fan 910 according to another embodiment. The pedestal fan 910 of FIG. 19 is similar to the pedestal fan 10 described above with reference to FIGS. 1-11, and similar features are identified with similar reference numbers, plus "900." Some differences between the pedestal fan 10 and the pedestal fan 910 are described.

The pedestal fan 910 may include a body 914, a base 918, a protective frame 900, and a fan head assembly 926 substantially similar to the fan head assembly 26 of FIGS. 1-11. The fan head 926 may be removably coupled to the body 914. The body 914 may be adjustably received in the base 918 to selectively adjust the height and/or direction of the fan head assembly 926. As shown in FIG. 19, the body 914 and base 918 may include complimentary ramped or threaded surfaces 902 that accommodate adjustment of the pedestal fan 910. The base 918 may further include one or more legs 998 rotatably coupled to the base 918 to selectively provide an expanded support surface for the pedestal fan 910.

Figure 20:
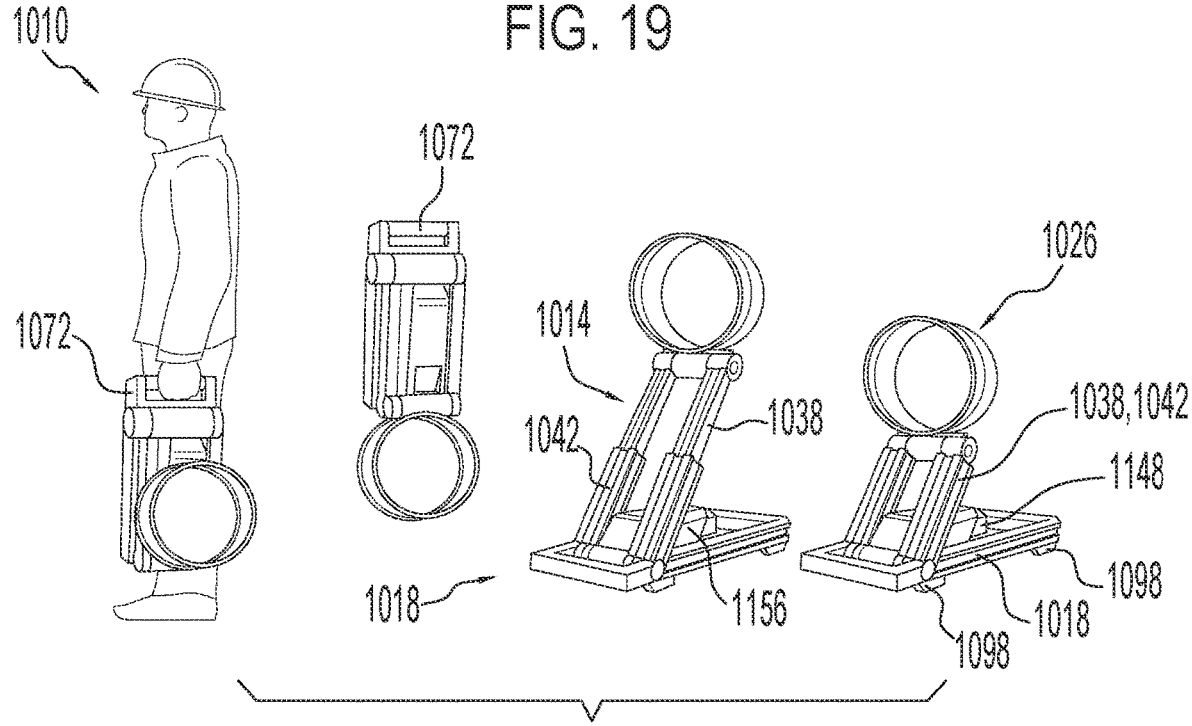
FIG. 20 is a perspective view of a portable fan assembly in a plurality of possible configurations, including a collapsed carrying case configuration, according to another embodiment.

FIG. 20 illustrates a fan assembly 1010 according to another embodiment. The fan 1010 of FIG. 20 is similar to the pedestal fan 10 described above with reference to FIGS. 1-11, and similar features are identified with similar reference numbers, plus "1000." Some differences between the pedestal fan 10 and the fan assembly 1010 are described.

The fan assembly 1010 tmay be operated in multiple expanded positions and transported in one or more collapsed positions. The fan assembly 1010 may include a body 1014, a base 1018, a head assembly 1026, extension poles 1038, 1042, one or more legs 1098, a battery pack 1148, and a battery pack receptacle 1156. FIG. 20 further illustrates the fan assembly 1010 in a collapsed position that reduces an overall profile/perimeter of the fan assembly 1010 to a substantially briefcase sized configuration that allows the fan assembly 1010 to be easily transportable and/or storable by a user. The fan assembly 1010 of FIG. 20 may be a battery powered "bladeless fan" powered by the battery pack 1148.

The base 1018 of the fan assembly 1010 may be supported by the legs 1098 while the fan assembly 1010 is in an expanded or in use position. The extension poles 1038, 1042 may be adjusted to alter the overall height of the fan assembly 1010. The lower pole 1042 may be rotatably coupled to the base 1018 while the upper pole 1038 may be rotatably or hingedly coupled to the fan head 1026. The base 1018 may also double as a carrying handle 1072 for carrying the fan assembly 1010 while in the collapsed configuration.

Figure 21:
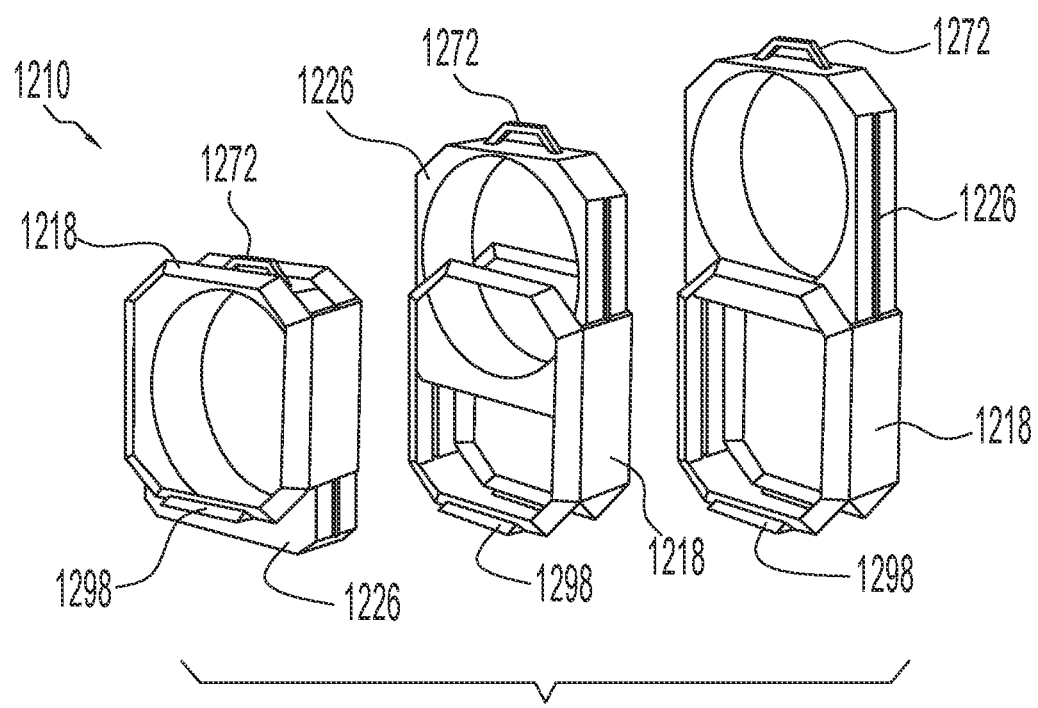
FIG. 21 is a perspective view of a portable fan assembly in a plurality of possible configurations, including an expanded configuration and a nested configuration, according to another embodiment.

FIG. 21 illustrates a battery powered portable fan 1210 according to another embodiment. The fan 1210 of FIG. 21 is similar to the pedestal fan 10 described above with reference to FIGS. 1-11, and similar features are identified with similar reference numbers, plus "1200." Some differences between the pedestal fan 10 and the fan assembly 1210 are described.

The portable fan 1210 includes a base 1218 and a fan head 1226 nestably received within the base 1218. The fan 1210 is moveable between a nested position in which the fan head 1226 is nested within the base 1218 and an expanded position in which the fan head 1226 extends from an opening of the base 1218 to increase the height of the fan head 1226. The head 1226 may also include a carrying handle 1272 configured to carry to the fan 1210 in either the nested or expanded positions. The head 1226 may be moveable through various types of connections such as a sliding connection, drawer-type connection, etc. and may utilize detents, flanges, bearings, springs, or the like. As further shown in FIG. 21, the fan 1210 may be supported on one or more supports or legs 1298 while in the expanded position. The fan 1210 of FIG. 21 may be a "bladeless fan" or otherwise.

Figure 22:
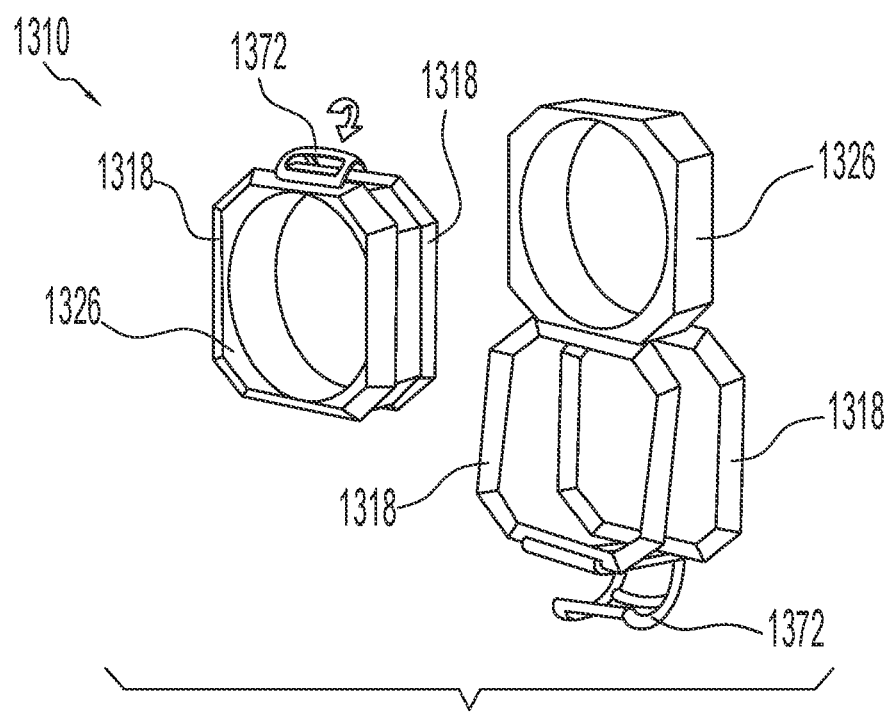
FIG. 22 is a perspective view of a portable fan assembly in a plurality of possible configurations, including a collapsed covered configuration and an expanded uncovered configuration, according to another embodiment.

FIG. 22 illustrates a battery powered portable fan 1310 according to another embodiment. The fan 1310 of FIG. 22 is similar to the pedestal fan 10 described above with reference to FIGS. 1-11, and similar features are identified with similar reference numbers, plus "1300." Some differences between the pedestal fan 10 and the fan assembly 1310 are described.

As illustrated in FIG. 22, the portable fan 1310 includes a two-piece base 1318 and a fan head 1326 selectively substantially surrounded by opposing pieces of the base 1318 on either side of the fan head 1326. The separate pieces of the base 1318 may be rotated relative the fan head 1326 between a nested/collapsed position in which the base 1318 is received on the head 1326 and an expanded position in which the base 1318 extends away from the head 1326 to alter a height of the fan 1310. As shown in FIG. 22, the base 1318 may be rotated by about 180 degrees between the collapsed position and the expanded position.

The base 1318 may also support a handle 1372 that may also be utilized as a clasp to selectively clasp the pieces of the base 1318 together. The handle 1372 may accommodate carriage of the fan 1310 while in the nested position. The handle 1372 may further clasp the two pieces of the base 1318 together while in the expanded position to prevent the base 1318 pieces from moving away from one another. The fan 1310 of FIG. 22 may be a "bladeless fan" or otherwise.

Figure 23:
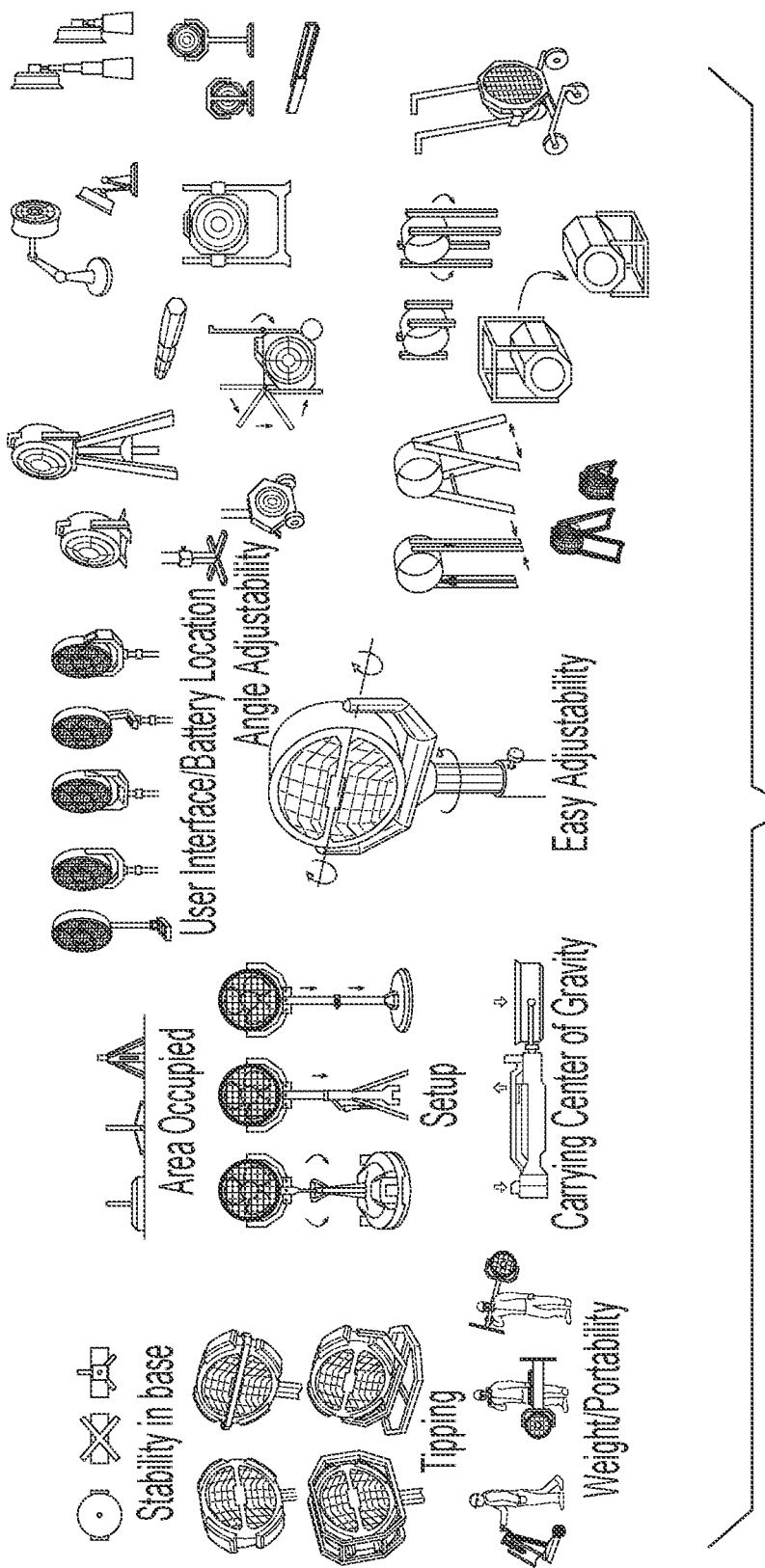
FIG. 23 illustrates example constructions of portable pedestal fans, according to other embodiments.

FIG. 23 illustrates contemplated fan assemblies including a base having a counterweight, a base having a cross-type legged base, a fan having a center of gravity configured to prevent tipping or improve ease of carrying, a fan assembly portable on a rolling cart/dolly, and a fan assembly having various features for improving the usability of fans.

Figure 24:
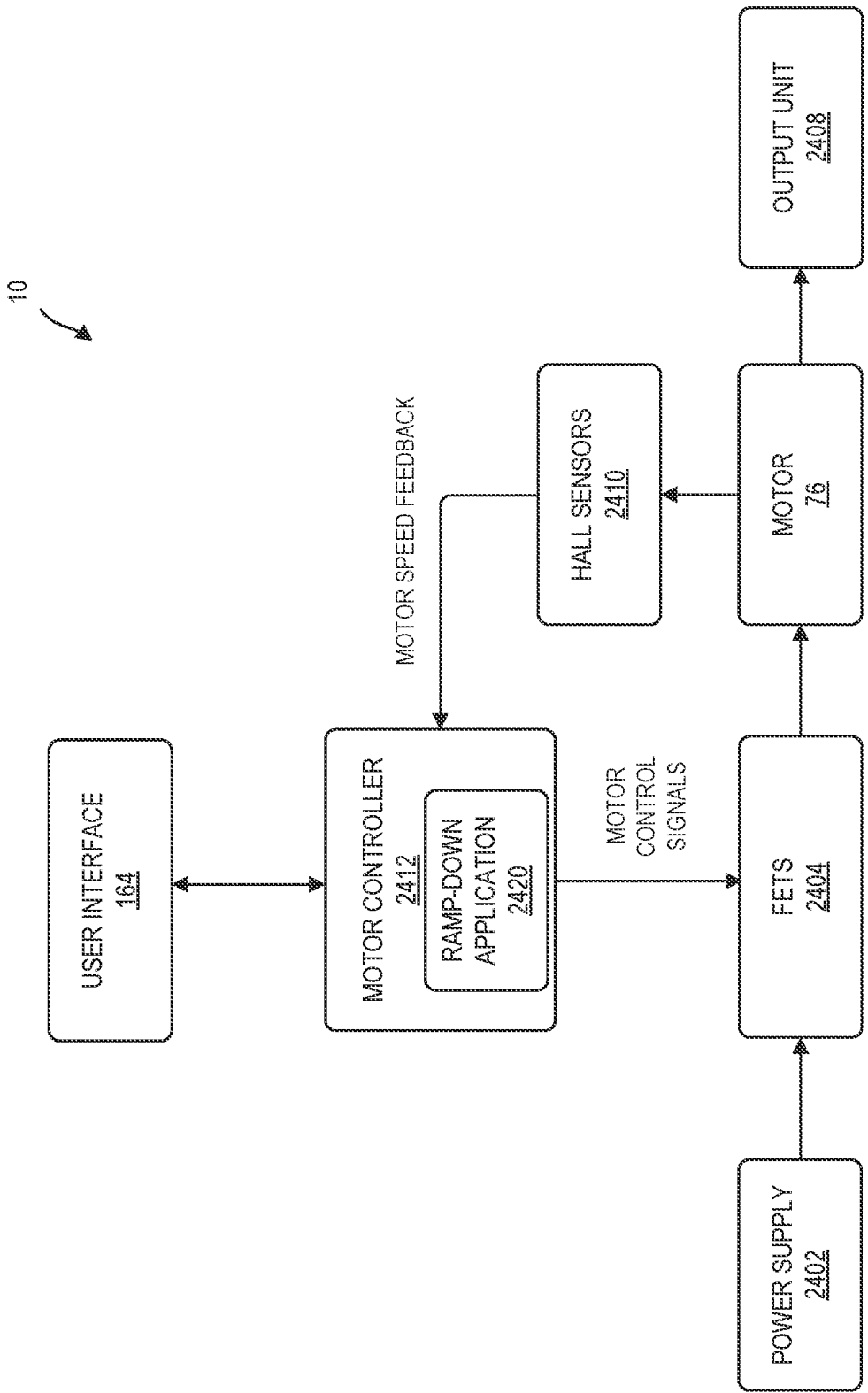
FIG. 24 is a block diagram of fan control system, according to some embodiments.

Turning now to FIG. 24, a block diagram of a fan, such as pedestal fan 10, or one of the other fans described herein, is shown, according to some embodiments. The pedestal fan 10 includes a power supply 2402, a motor drive circuit 2404, such as field effect transistors (FETs), a motor 76, an output unit 2408 (e.g., output spindle 88), Hall effect sensors 2410, a motor controller 2412, and a user interface 164. The Hall effect sensors 2410 provide motor information feedback to the motor controller 2412, such as motor rotational position information, which can be used by the motor controller 2412 to determine position, velocity, and/or acceleration of the motor 76. In some embodiments, other sensing techniques, such as back-emf sensing may allow for determination of motor rotation speed without the need for the Hall effect sensors 2410.

The motor controller 2412 includes an electronic processor and a memory storing instructions that, when executed by the electronic processor, cause the motor controller 2412 to carry out the functionality of the controller described herein. For example, the memory of the motor controller 2412 may include a ramp-down application 2420, which may include instructions configured to perform the various ramp-down functions described herein. The motor controller 2412 is configured to receive inputs from the user interface 164 and/or the power supply 2402 for use when controlling the motor 76 and/or executing functions such as the ramp-down functions described below.

The user interface 164 may be configured to receive an input from, or provide feedback to, one or more users. For example, the user interface 218 may include a display configured to provide information to the user regarding the status or operational mode of the pedestal fan 10. For example, the user interface 164 may be a series of LEDs or other indicators, a touchscreen, a display screen, or other visual device. The user interface 164 may further include one or more user input devices, such as pushbuttons, knobs, toggle switches, sliders, rotating dials, etc. The user input devices can allow a user to provide inputs to the user interface 164, such as speed control. In some embodiments, the user input devices may allow for a user to select from a variety of speed modes (e.g., HIGH Speed, MEDIUM Speed, LOW Speed, OFF). In other examples, the user input devices can allow a user to select a speed from a range of speeds, such as from 0-100% (e.g., full speed). The user interface 218 may be supported on the fan or may be part of a separate device (e.g., a remote control, a smartphone, etc.).

In some embodiments, the motor 76 is controlled electronically rather than using a gear box or mechanical controls. In response to the motor information feedback from the Hall effect sensors 2410 and user control input from the user input 164, the motor controller 2412 transmits control signals to accurately control the motor drive circuit 2404 to drive the motor 76. By selectively enabling and disabling the motor drive circuit 2404, power received from the power supply 2402 is selectively applied to the motor 76 to cause rotation of a rotor of the motor 76. The rotating rotor of the motor 76 drives the output unit 2408. In some embodiments, the motor speed indicated by the output of the Hall effect sensors 2410 enables the motor controller 2412 to implement closed loop speed control. The closed loop speed control enables the motor controller 2412 to adjust motor power to maintain an RPM selected by the user interface 164, as a load on the motor 76 varies during an operation. For example, using the closed loop speed control, the motor controller 2412 may increase motor power to maintain a selected maximum RPM when a load is increased. The control signals sent by the motor controller 2412 to the motor drive circuit 2404 may comprise pulse width modulation (PWM) signals that drive the speed of the motor 76 based on a duty cycle of the PWM signals.

The motor controller 2412 and other components of pedestal fan 10 are electrically coupled to and receive power from the power supply 2402. As described above, the power supply 2402 may receive power from a battery, such as battery pack 148 described above. In some embodiments, the power supply 2402 includes one or more lithium-ion battery packs. In one example, the power supply 2402 includes an 18V lithium-ion battery pack. However, lithium-ion battery packs of more than 18V or less than 18V are also contemplated. In other embodiments, the power supply 2402 may be another energy storage device, such as alkaline batteries, lead acid batteries, nickel metal hydride batteries, etc. In still further embodiments, the power supply 2402 may also be configured as an AC power source, such as provided by a utility, as described above. In some examples, the power supply 2402 may be configured to charge the battery pack 148 when an AC power source is coupled to the power supply 2402.

Figure 25:
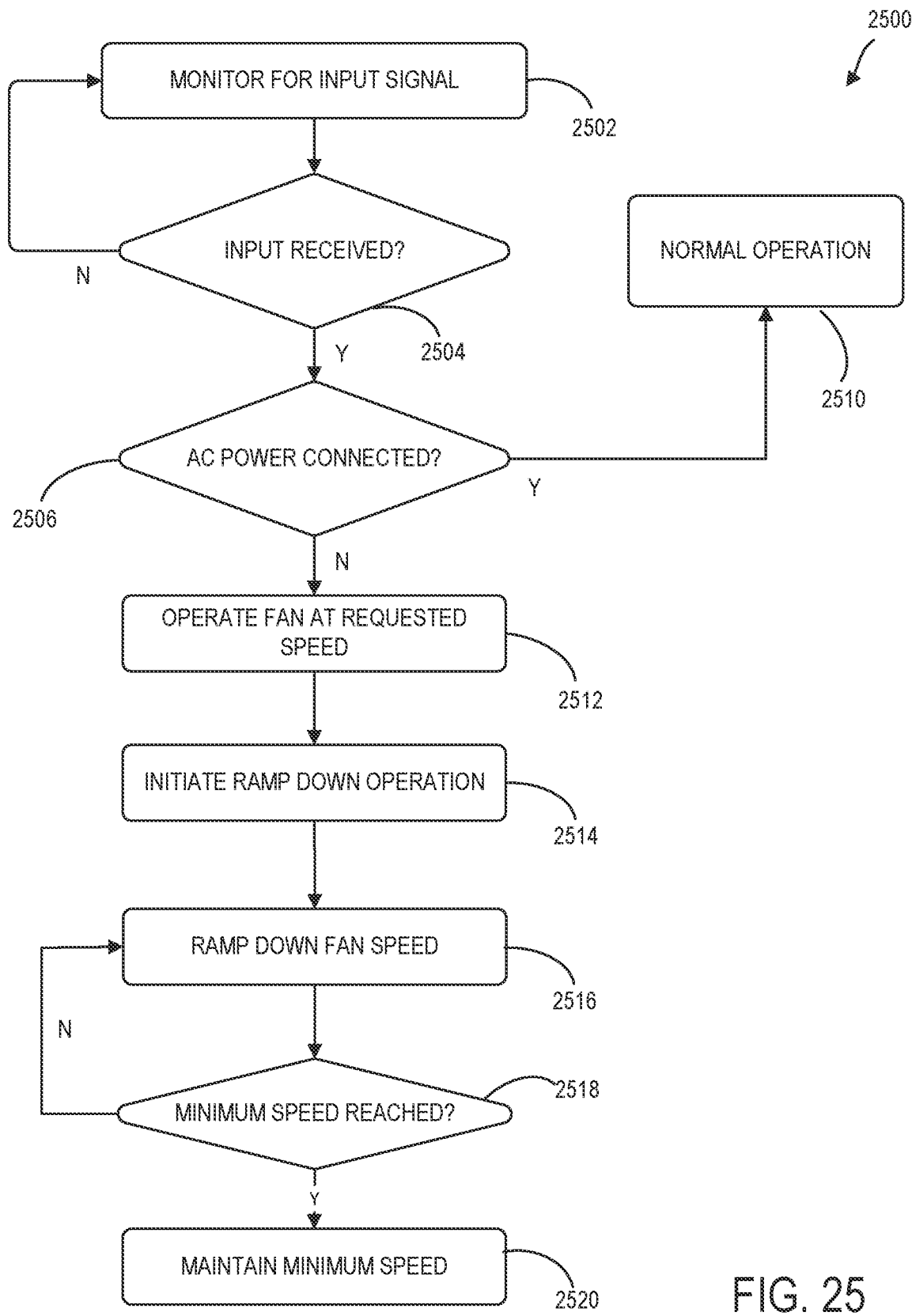
FIG. 25 is a flow chart of illustrating an operating process of the pedestal fan of FIG. 1, according to an example embodiment.

Turning now to FIG. 25, a process 2500 for operating a pedestal fan, such as pedestal fan 10 is described according to some embodiments. While described with respect to pedestal fan 10, it is contemplated that the process 2500 may be performed by other fans described or not described herein. In one embodiment, the process 2500 may be executed by the motor controller 2412 and may further be executed in conjunction with one or more applications stored in a memory of the motor controller 2412, such as the ramp-down application 2420. At process block 2502, the motor controller 2412 monitors for an input from the user interface 164. Example inputs may include a fan ON input, a requested speed input, and/or a fan OFF input. At process block 2504, the motor controller 2412 determines whether an input is received, such as via the user interface 164.

In response to determining that no input has been received, the motor controller 2412 continues to monitor for an input signal at process block 2502. In response to determining that an input has been received, the motor controller 2412 then determines whether an AC (or other external) power source is coupled to the pedestal fan 10, such as via the power supply 2402 at process block 2508. In some embodiments, the power supply 2402 may provide an indication to the motor controller 2412 indicating whether AC power is coupled to the pedestal fan 10 and providing power. In response to determining that AC power is coupled to the pedestal fan 10, the motor controller 2412 operates the motor 76 normally based on the received input at process block 2510. For example, the motor controller 2412 will operate the motor 76 at a speed based on the received input.

In response to determining that the AC power is not connected to the pedestal fan 10 (e.g., the pedestal fan is running off battery power), the motor controller 2412 operates the motor 76 at a speed based on the received input at process block 2512. The motor controller 2412 then initiates a ramp-down operation at process block 2514. The ramp-down operation is configured to ramp-down the speed of the motor 76 over time. By ramping the motor 76 (and therefore fan) speed over time, the life of a battery pack, as described above, may be extended while still maintaining sufficient output (i.e., cubic feet per minute ("CFM")). For example, battery life may be extended by 20% using a ramp-down operation as described herein. In some embodiments, the ramp-down operation may be configured to allow for a desired run time of the pedestal fan 10 to be achieved. For example, the desired run time may be 90 minutes. However, desired run times of more than 90 minutes or less than 90 minutes are also considered. In some examples, the desired run time may be based on a recommended battery pack rating (e.g., 5 Ah, 3 Ah, etc.). In still further embodiments, the power supply 2402 may provide an indication of the battery pack rating to the motor controller 2412, which may then determine the ramp-down operation based on the battery pack rating to achieve the desired run time.

At process block 2516, the motor controller 2412 ramps down the speed of the motor 76 over time. In some embodiments the speed of the motor 76 is reduced over time using a linear function having a predetermined slope. For example, the slope may be approximately 2 CFM per minute. However, slopes of more than 2 CFM per minute or less than 2 CFM per minute are also contemplated. In some examples, non-linear ramps may also be used, such as logarithmic, polynomial, etc. The motor controller 2412 then determines whether a minimum speed has been reached at process block 2518. The minimum speed may be a percentage of the desired speed provided via the user input 164. For example, the minimum speed may be approximately 85% of the desired speed. However, values of more than 85% of the desires speed and less than 85% of the desired speed are also contemplated.

In response to determining that the minimum speed has not been reached, the motor controller 2412 continues to ramp down the motor 76 speed at process block 2516. In response to determining that the minimum speed has been reached, the motor controller 2412 operates the motor at the minimum speed at process block 2520. The motor controller 2412 may continue to operate the motor 76 at the minimum speed until another input is received to control the speed of the motor 76. In some examples, the motor controller 2412 may operate the motor 76 at the minimum speed until the battery pack is exhausted and the motor 76 is stopped.

Figure 26:
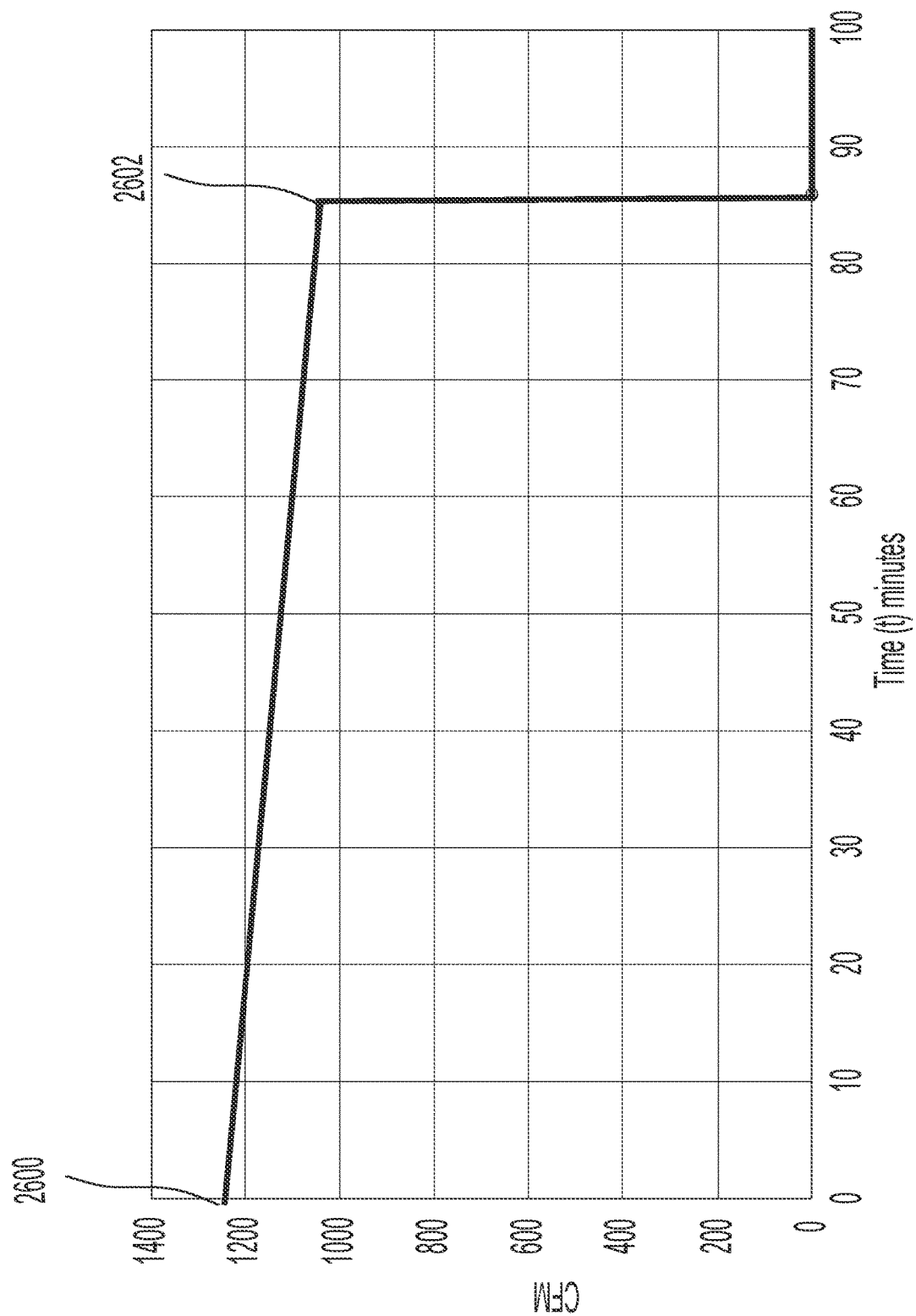
FIG. 26 is a graph illustrating an example ramp-down operation of a fan, according to an example embodiment.

Turning now to FIG. 26, a graph showing a ramp-down operation, similar to that described above, is shown according to some embodiments. At point 2600, the motor 76 is operated at the desired operating speed, shown to be approximately 1250 CFM. The ramp down operation then begins and the motor speed is ramped down over time until point 2602, shown to be approximately 85 minutes, at which time the motor is stopped. The motor 76 may be stopped due to insufficient power in a battery pack or due to an OFF command being received via the user input 164. While not shown in FIG. 26, a minimum speed may be reached as noted above, in which case the motor 76 will operate at the minimum speed until the battery pack is exhausted, or an input signal changing the operating mode of the pedestal fan 10 is received via the user interface 164.

Although the invention has been described in detail with reference to certain preferred embodiments, variations and modifications exist within the scope and spirit of one or more independent aspects of the invention as described. As such, it will be appreciated that variations and modifications to the elements and their configuration and/or arrangement exist within the spirit and scope of one or more independent aspects as described. For example, the various bases 18, 218 . . . etc. could include one or more counterweights and/or wheels, although such features are not specifically illustrated. Furthermore, rotatable housings, telescoping elements, as well as additional features thereof, could be interchangeably incorporated across multiple embodiments, discussed or otherwise.

The invention claimed is:

1. A portable fan comprising:
    a power supply;
    a motor coupled to a plurality of fan blades and powered by the power supply;
    a battery pack coupled to the portable fan and configured to provide power to the power supply; and
    a controller configured to receive power from the power supply, the controller configured to:
        receive an input to control the motor at a requested speed,
        operate the motor at the requested speed, and
        initiate a ramp-down operation, wherein the ramp-down operation is configured to ramp down the speed of the motor from the requested speed over a period of time.

2. The portable fan of claim 1, wherein the controller is further configured to:
    determine whether a minimum ramp-down speed has been reached, and operate the motor at the minimum ramp-down speed in response to determining that the minimum ramp-down speed has been reached.

3. The portable fan of claim 2, wherein the minimum ramp-down speed is 85% of the requested speed.

4. The portable fan of claim 1, wherein the controller is further configured to:
determine whether an AC power is coupled to the power supply, and
operate the motor at the requested speed in response to determining that the AC power is coupled to the power supply.

5. The portable fan of claim 1, wherein the ramp-down operation reduces the speed of the motor over time using a predetermined ramp-down rate.

6. The portable fan of claim 5, wherein the predetermined ramp-down rate reduces the output of the portable fan by 2 CFM per minute.

7. The portable fan of claim 1, wherein the battery pack is an 18V power tool battery pack.

8. A method for controlling a portable fan powered by a removable battery pack, the method comprising:
receiving an input to control a motor of the portable fan at a requested speed;
operating the motor at the requested speed;
initiating a ramp-down operation, wherein the ramp-down operation is configured to ramp down the speed of the motor from the requested speed over a period of time.

9. The method of claim 8, further comprising:
determining whether a minimum ramp-down speed has been reached; and
operating the motor at the minimum ramp-down speed in response to determining that the minimum ramp-down speed has been reached.

10. The method of claim 8, wherein the minimum ramp-down speed is 85% of the requested speed.

11. The method of claim 8, further comprising:
determining whether an AC power is coupled to a power supply of the portable fan; and
operating the motor at the requested speed in response to determining that the AC power is coupled to the power supply.

12. The method of claim 8, wherein the ramp-down operation reduces the speed of the motor over time using a predetermined ramp-down rate.

13. The method of claim 12, wherein the predetermined ramp-down rate is configured to increase a run time of a battery pack coupled to the portable fan by 20%.

14. The method of claim 12, wherein the predetermined ramp-down rate reduces the output of the portable fan by 2 CFM per minute.

15. A portable fan comprising:
a power supply;
a motor coupled to a plurality of fan blades and powered by the power supply;
a battery pack coupled to the portable fan and configured to provide power to the power supply; and
a controller configured to receive power from the power supply, the controller configured to:
receive an input to control the motor at a requested speed,
determine whether an AC power is coupled to the power supply,
operate the motor at the requested speed in response to determining that the AC power is coupled to the power supply,
initiate a ramp-down operation in response to determining that the AC power is not coupled to the power supply, wherein the ramp-down operation is configured to ramp down the speed of the motor from the requested speed over a period of time in response to determining that the AC power is not coupled to the power supply,
determine whether a minimum ramp-down speed has been reached, and
operate the motor at the minimum ramp-down speed in response to the minimum ramp-down speed being determined to be reached.

16. The portable fan of claim 15, wherein the power supply is configured to charge the battery pack when AC power is coupled to the power supply.

17. The portable fan of claim 15, wherein the ramp-down operation reduces the speed of the motor over time using a predetermined ramp-down rate.

18. The portable fan of claim 17, wherein the predetermined ramp-down rate is configured to allow the battery pack to power the motor for a desired operating time.

19. The portable fan of claim 18, wherein the desired operating time is 90 minutes.

20. The portable fan of claim 17, wherein the predetermined ramp-down rate is configured to reduce the output of the portable fan by 2 CFM per minute.

* * * * *